(12) United States Patent
Erol et al.

(10) Patent No.: US 7,206,773 B2
(45) Date of Patent: Apr. 17, 2007

(54) TECHNIQUES FOR ACCESSING INFORMATION CAPTURED DURING A PRESENTATION USING A PAPER DOCUMENT HANDOUT FOR THE PRESENTATION

(75) Inventors: Berna Erol, Burlingame, CA (US); Jamey Graham, San Jose, CA (US); Jonathan J. Hull, San Carlos, CA (US); Dar-Shyang Lee, Union Way, CA (US)

(73) Assignee: Ricoh Company, Ltd, Tokyo (JP)

( * ) Notice: Subject to any disclaimer, the term of this patent is extended or adjusted under 35 U.S.C. 154(b) by 533 days.

(21) Appl. No.: 10/660,867

(22) Filed: Sep. 12, 2003

(65) Prior Publication Data

US 2004/0205347 A1 Oct. 14, 2004

Related U.S. Application Data

(60) Provisional application No. 60/462,412, filed on Apr. 11, 2003.

(51) Int. Cl.
  *G06F 17/00* (2006.01)
  *G06F 17/30* (2006.01)
(52) U.S. Cl. .............................. 707/1; 707/3; 715/500; 715/732
(58) Field of Classification Search ................ 707/1–2; 715/500
  See application file for complete search history.

(56) References Cited

U.S. PATENT DOCUMENTS

| 5,583,980 | A | 12/1996 | Anderson |
| 6,122,647 | A | 9/2000 | Horowitz et al. |
| 6,243,713 | B1 | 6/2001 | Nelson et al. |
| 6,370,498 | B1 | 4/2002 | Dabral et al. |
| 6,732,915 | B1 * | 5/2004 | Nelson et al. .............. 235/375 |
| 2002/0056082 | A1 | 5/2002 | Gage et al. |
| 2002/0120939 | A1 | 8/2002 | Wall et al. |
| 2002/0191013 | A1 | 12/2002 | Abrams |
| 2003/0009342 | A1 | 1/2003 | Haley |
| 2005/0041872 | A1 | 2/2005 | Yim et al. |

FOREIGN PATENT DOCUMENTS

| EP | 0 459 793 A1 | 12/1991 |
| WO | WO 99/50736 A1 | 10/1999 |
| WO | WO 00/52596 A2 | 9/2000 |

OTHER PUBLICATIONS

Stifelman, "The Audio Notebook: Paper and Pen Interaction with Structured Speech;" Sep. 1997; Ph.D Thesis; Massachusetts Institute of Technology.

(Continued)

*Primary Examiner*—Alford W. Kindred
(74) *Attorney, Agent, or Firm*—Jason D. Lohr

(57) ABSTRACT

Techniques that enable information recorded during a presentation to be accessed or retrieved using a handout printed for the presentation. A user can select one or more items, such as slides, printed on the handout and access portions of the recorded information when the user-selected items were presented or displayed. Different types of information may be accessed. Different actions may also be performed on the retrieved information.

62 Claims, 14 Drawing Sheets

OTHER PUBLICATIONS

Stifelman, et al.; "The Audio Notebook: paper and pen interaction with structured speech;" *Proc. of International Conf. on Human Factors in Computing Systems* Mar. 31-Apr. 5, 2001; pp. 182-189; CHI.

Web page; "TELEform V7—Digitale Beleglesung, Automatische Datenerfassung aus Formularen;" Form-Solutions; at URL=http://www.form-solutions.net/dl/Teleform.pdf>printed Feb. 10, 2005; 5 pages.

Web page; "Xerox Office Software Suite FlowPort Version 2.1.1;" *Capture and Distribution*; at URL=http://www.xrce.xerox.com/showroom/pdf/flowport.pdf>; printed Feb. 10, 2005; 4 pages.

Won et al.; "Efficient Use of MPEG-7 Edge Histogram Descriptor;" *ETRI Journal*; Feb. 2002; pp. 23-30; vol. 24; No. 1.

Brotherton et al., "Automated Capture, Integration, and Visualization of Multiple Media Streams," *Proceedings of IEEE Multimedia '98*, (1998).

Chiu et al., "Room with a Rear View: Meeting Capture in a Multimedia Conference Room," *IEEE Multimedia Magazine*, 7(4):48-54 (2000).

Chiu et al., "Automatically Linking Multimedia Meeting Documents by Image Matching," *Proceedings of Hypertext '00*, ACM Press, pp. 244-245 (2000).

Franklin et al., "Jabberwocky: you don't have to be a rocket scientist to change slides for a hydrogen combustion lecture," *Intelligent User Interfaces*, pp. 98-105 (2000).

Lee et al., "Portable Meeting Recorder," *ACM Multimedia Conference*, 2002.

Lienhart et al., "Localizing and Segmenting Text in Images, Videos and Web Pages," *IEEE Transactions On CSVT*, pp. 256-268 (2002).

Mukhopadhyay et al., "Passive capture and structuring of lectures," *ACM Multimedia*, pp. 477-487 (1999).

Muller et al., "The 'Authoring of the Fly' system for Automated Recording and Replay of (Tele)presentations," *ACM/Springer Multimedia Systems Journal*, vol. 8, No. 3 (2000).

Multi-university Research Laboratory, murl.microsoft.com; webpage printed Feb. 18, 2004.

Otsu, N., "A threshold selection method from gray-level histograms," *IEEE Transactions on Systems, Man and Cybernetics*, pp. 62-66 (1979).

Pimentel et al., "Linking by Interacting: a Paradigm for Authoring Hypertext," *Proceedings of ACM Hypertext '2000*, May 2000.

Scansoft Capture Development System, www.scansoft.com; webpage printed Feb 18, 2004.

Transym OCR engine, http://www.transym.com/.

Trier et al., "Goal-Directed Evaluation of Binarization Methods,"*IEEE Transactions on Pattern Analysis and Machine Intelligence*, pp. 1191-1201 (1995).

Waibel et al., "Advances in automatic meeting record creation and access,"*Proceedings of ICASSP*, Seattle (2001).

WebEx Presentation Studio, presenter.com.

\* cited by examiner

FIG. 4B

```
<PRESENTATION-MAP>
    <SLIDE>
        <slideNo>1</slideNo>
        <MATCHES>
            <MATCHITEM type="audio" source="rtsp://somewhere.com/audio.rm">
                <matchCapNo>2</matchCapNo>
                <begin>0</begin>
                <end>14813</end>
            </MATCHITEM>
            <MATCHITEM type="video" source="rtsp://somewhere.com /video.rm">
                <matchCapNo>35</matchCapNo>
                <begin>2037211</begin>
                <end>2045243</end>
            </MATCHITEM>
            ...
        </MATCHES>
    </SLIDE>
    ...
</PRESENTATION-MAP>
```

*FIG. 7B*

TECHNIQUES FOR ACCESSING INFORMATION CAPTURED DURING A PRESENTATION USING A PAPER DOCUMENT HANDOUT FOR THE PRESENTATION

CROSS-REFERENCES TO RELATED APPLICATIONS

The present application is a non-provisional of and claims priority from U.S. Provisional Application No. 60/462,412, filed Apr. 11, 2003, the entire contents of which are herein incorporated by reference for all purposes.

The present application incorporates by reference for all purposes the entire contents of the following:

U.S. Application No. 10/412,757, filed Apr. 11, 2003;

U.S. Application No. 10/661,052, filed concurrently with this application;

U.S. Application No. 10/412,757, filed concurrently with this application;

U.S. Application No. 10/001,895, filed Nov. 19, 2001.

BACKGROUND OF THE INVENTION

The present application relates to field of accessing recorded information, and more particularly to techniques for accessing recorded information using a paper interface.

Recording information during presentations has many gained a lot of popularity in recent years. For example, colleges and universities have started to program classes and lectures, corporations have started to record meetings and conferences, etc. The information during a presentation may be recorded using one or more capture devices. The recorded info may comprise different types or streams of information including audio information, video information, and the like.

The recorded information is then available for use by a user after the presentation. The conventional way for accessing these recordings has been by viewing the recordings sequentially. More efficient techniques are desired for accessing or retrieving the recorded information or indexing into the recorded information.

BRIEF SUMMARY OF THE INVENTION

Embodiments of the present invention provide techniques for allowing information recorded during a presentation to be accessed or retrieved using a handout printed for the presentation. A user can select one or more items, such as slides, printed on the handout and access portions of the recorded information when the user-selected items were presented or displayed. Accordingly, the user can access the recorded information or portions thereof using the paper document handout. Different types of information may be accessed. Different actions may also be performed on the retrieved information.

According to an embodiment of the present invention, techniques are provided for enabling information recorded during a presentation to be accessed using a printed paper document for the presentation. In this embodiment, prior to occurrence of the presentation, information is received identifying a set of items to be printed in the paper document for the presentation. Recorded information is accessed comprising information recorded during the presentation. The recorded information is processed to determine time information for one or more items that were presented during the presentation from the set of items, the time information for each item in the one or more items indicative of when information related to the item was presented during the presentation.

According to another embodiment of the present invention, techniques are provided for accessing information using a paper document. In this embodiment, first information is stored comprising time information for one or more slides presented at a presentation, the time information for each slide in the one or more slides indicative of when the slide was presented during the presentation. A signal is received indicating selection of a slide from a set of slides printed on a paper document for the presentation. Time information is determined for the selected slide using the first information, the time information for the selected slide indicative of when the selected slide was presented during the presentation. Information is accessed from information recorded during the presentation based upon the time information determined for the selected slide.

The foregoing, together with other features, embodiments, and advantages of the present invention, will become more apparent when referring to the following specification, claims, and accompanying drawings.

BRIEF DESCRIPTION OF THE DRAWINGS

FIG. 4B depicts the page shown in FIG. 4A with user markings according to an embodiment of the present invention;

FIG. 7B depicts an extended XML structure according to an embodiment of the present invention;

DETAILED DESCRIPTION OF THE INVENTION

In the following description, for the purposes of explanation, specific details are set forth in order to provide a thorough understanding of the invention. However, it will be apparent that the invention may be practiced without these specific details.

Figure 1:
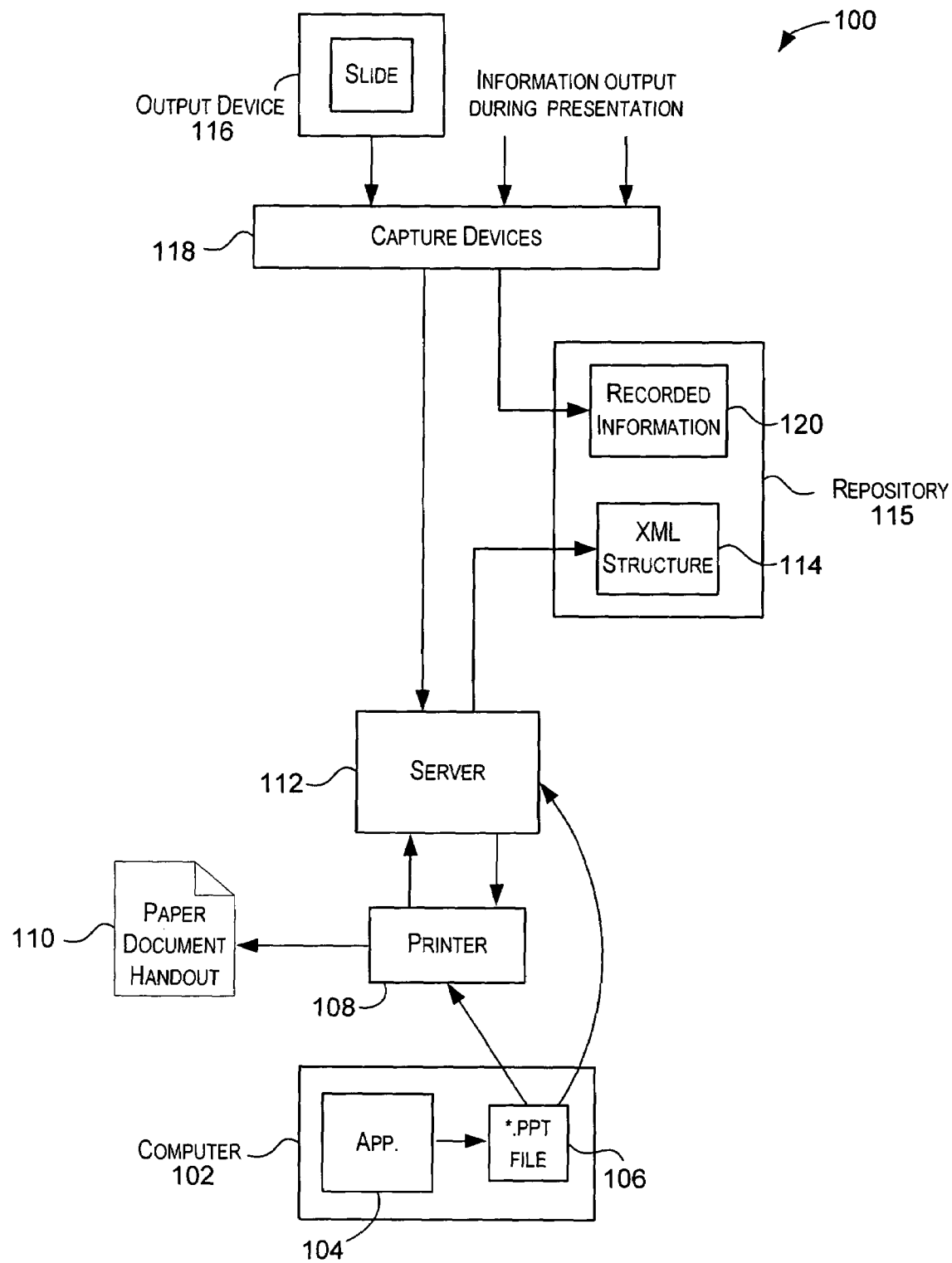
FIG. 1 is a simplified block diagram of a system that may incorporate an embodiment of the present invention.

FIG. 1 is a simplified block diagram of a system 100 that may incorporate an embodiment of the present invention. System 100 depicted in FIG. 1 is merely illustrative of an embodiment incorporating the present invention and does not limit the scope of the invention as recited in the claims. One of ordinary skill in the art would recognize other variations, modifications, and alternatives.

System 100 includes a computer system 102 that may be used by a user to prepare material to be presented at a presentation. Examples of presentations include lectures, meetings, conferences, classes, speeches, demonstrations, etc. The presentation material may include slides, photos, audio messages, video clips, text information, web pages, etc. The user may use one or more applications 104 executed by computer 102 to generate the presentation material. An example of a commonly used application for preparing slides to be presented at a presentation is PowerPoint™ provided by Microsoft™ Corporation. For example, as depicted in FIG. 1, the user may use PowerPoint™ application 104 to create a "presentation.ppt" file 106 (*.ppt file). A *.ppt file created using a PowerPoint™ application can comprise one or more pages, each page comprising one or more slides. A *.ppt file may also store information as to the order in which the slides are to be presented at the presentation and the manner in which the slides will be presented.

In addition to PowerPoint™ presentation files comprising slides, other types of files comprising other presentation material may also be created using different applications executed by computer 102. These files may be referred to in general as "symbolic presentation files". A symbolic presentation file is any file created using an application or program and that comprises at least some content that is to be presented or output during a presentation. A symbolic presentation file may comprise various types of contents such as slides, photos, audio messages, video clips, text, web pages, images, etc. A *.ppt file created using a PowerPoint™ application is an example of a symbolic presentation file that comprises slides.

The user may print portions of the presentation material on a paper medium to generate paper documents (also referred to as "paper handouts") that are usually handed out at the presentation. The term "paper medium" is intended to refer to any tangible medium on which information can be printed. The term "print" or "printing" is intended to include writing, imprinting, drawing, embossing, and the like. Each paper handout may comprise one or more paper pages. Depending on the number of people attending the presentation, multiple paper handouts may be printed.

As shown in FIG. 1, printer 108 may be used to print a paper handout 110. Various other devices that are capable of printing information on a paper medium may also be used to generate paper handouts. Examples of such devices include facsimile machines, copiers, scanners, and the like.

Figure 4A:
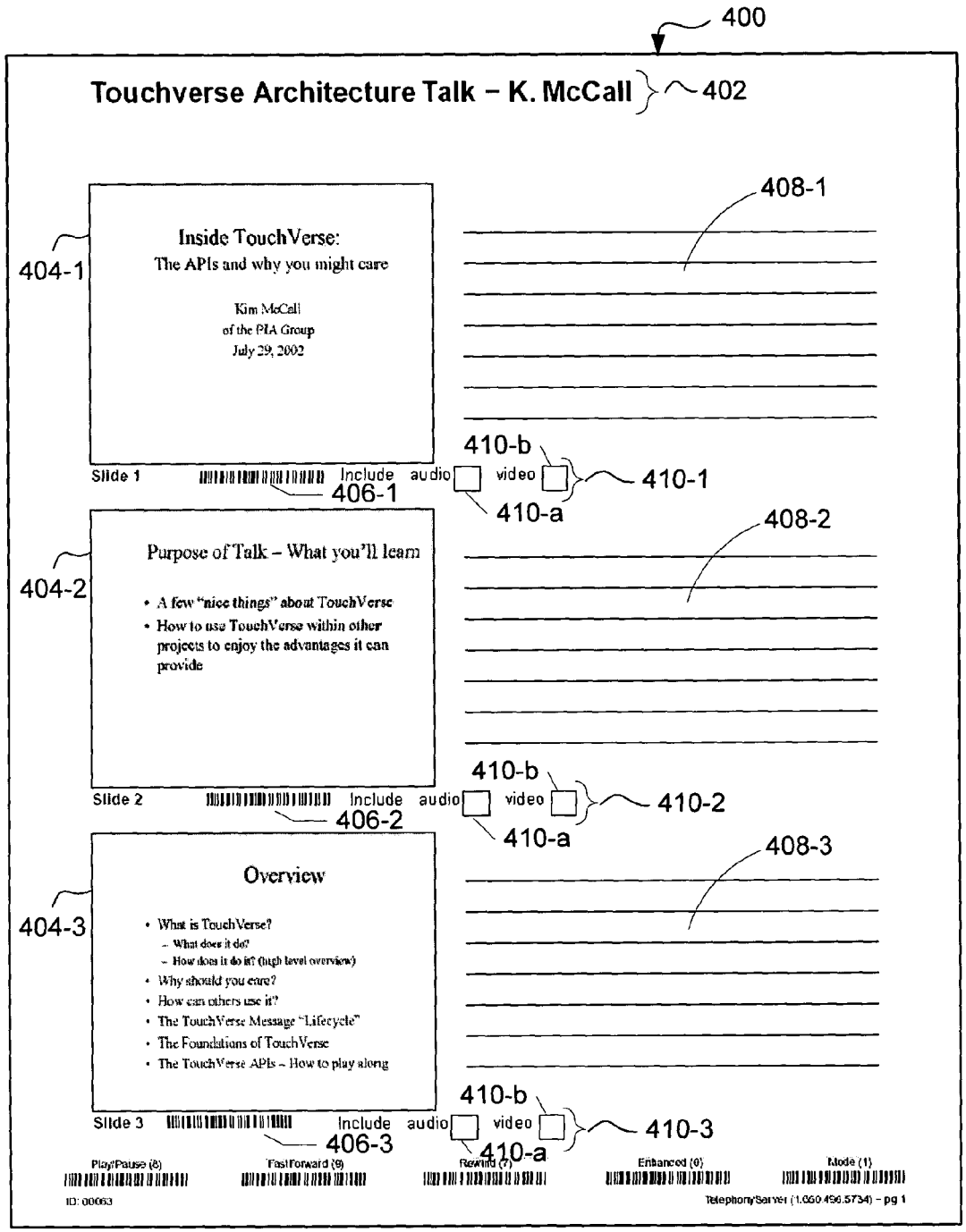
FIG. 4A depicts a simplified page from a paper document handout generated according to an embodiment of the present invention.
Figure 5A:
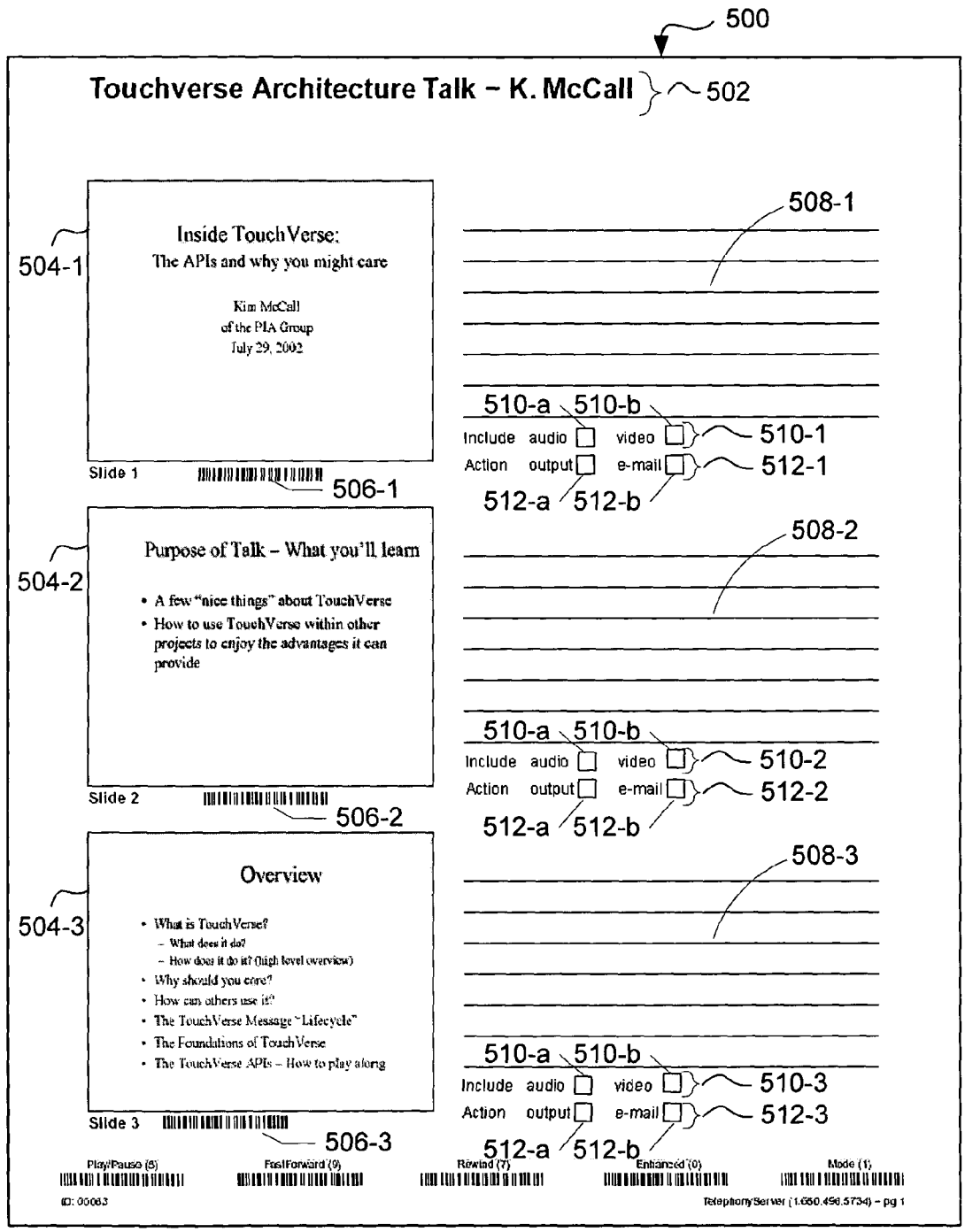
FIG. 5A depicts a simplified page from a paper document handout generated according to an embodiment of the present invention.

Various different items may be printed on a paper handout. Generally, the items printed on a handout relate to information to be presented or discussed during the presentation for which the handout is created. The printed items may include portions of presentation material or other material. Examples of items that can be printed include slides, photos, web pages, text information (e.g., a list of agenda items to be discussed at a meeting), and the like. For example, the user may print one or more slides from a *.ppt file on a paper handout. The PowerPoint™ application provides tools for printing one or more slides from a *.ppt file to generate a paper handout. Each page of the paper handout may have one or more slides printed on it. Examples of paper handout pages with slides printed on them are depicted in FIGS. 4A, 5A, and 5C and described below in further detail.

According to an embodiment of the present invention, when a paper handout is generated, information regarding the items that are to be printed in the handout is forwarded to a server 112. For example, according to an embodiment of the present invention, if a *.ppt file is to be printed to generate a handout, the *.ppt file is forwarded to server 112, or alternatively, the slides from the *.ppt file to be printed are forwarded to server 112. Server 112 is configured to generate a unique identifier for each item that is to be printed in the handout. Server 112 is also configured to obtain a representation of each item to be printed. Information related to the representations of the items to be printed and the unique identifiers for the items is then stored by server 112.

For example, if slides from a *.ppt file are to be printed, server 112 is configured to generate a unique identifier for each slide that is to be printed. An image (e.g., a JPEG image) of each slide to be printed is also obtained. The image acts as a representation of the slide to be printed. Various different techniques may be used for obtaining images of the slides. According to one technique, a PowerPoint™ application is capable of providing images of the slides in a *.ppt file. Other imaging techniques may also be used. For each slide to be printed, the unique identifier generated for the slide and the image of the slide are associated with each other and the information is stored. In one embodiment, the information is stored in the form of an XML structure 114 in a repository 115, as shown in FIG. 1. Further details related to processing performed for generating and storing the identifiers and images of slides are described below.

Figure 3A:
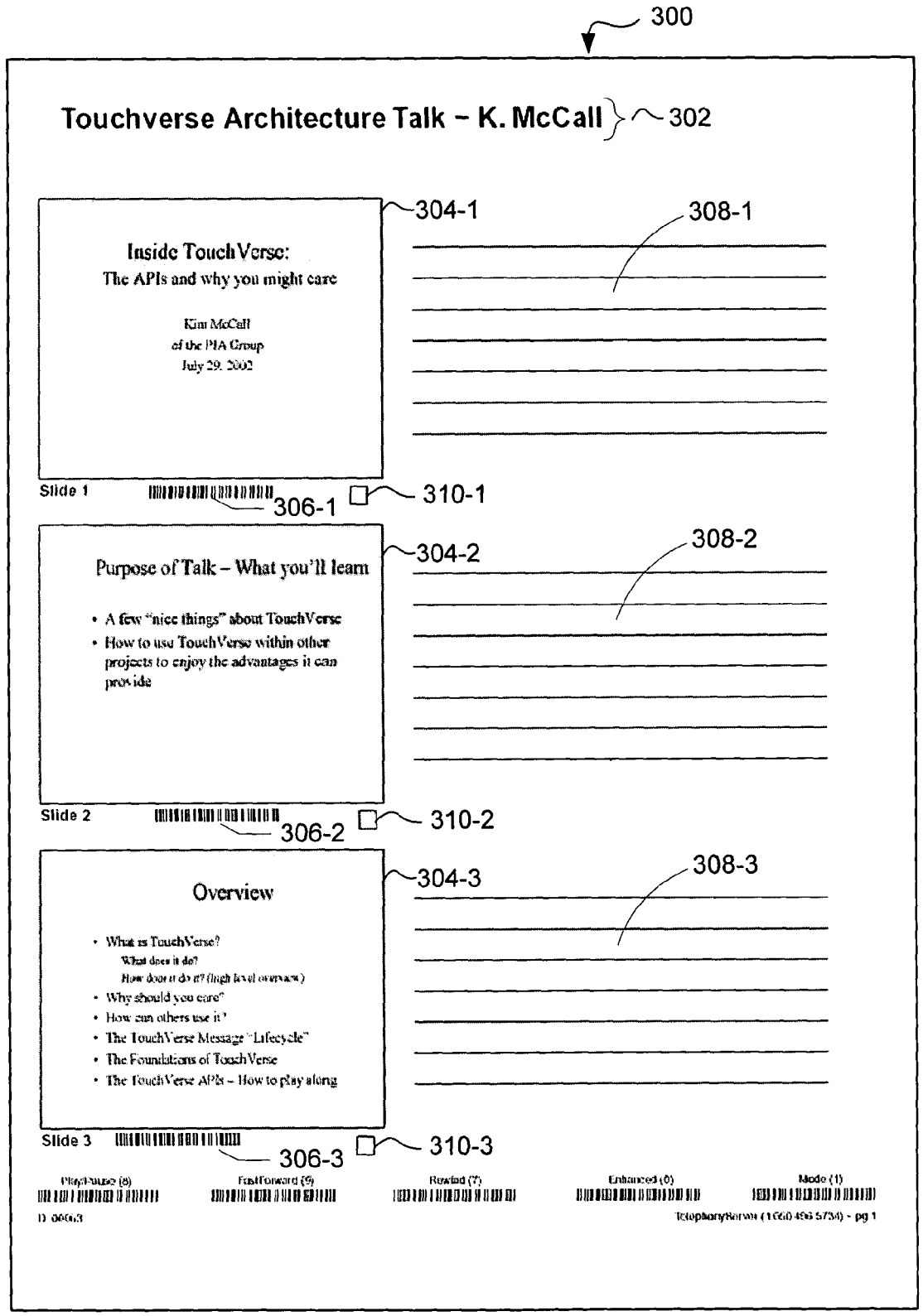
FIG. 3A depicts a simplified page from a paper document handout generated according to an embodiment of the present invention.

According to an embodiment of the present invention, for each item printed on a handout, the unique identifier generated for the item is also printed on the handout. The unique identifier for an item is generally printed proximal to its corresponding item. The identifiers may be printed in various forms. For example, the identifiers may be printed in the form of barcodes, numbers, images, text strings, etc. The unique identifiers may also be stored on chips (e.g., radio frequency chips) that are then physically attached to each handout. FIGS. 3A, 4A, and 5A, which are described below in further detail, provide examples of paper handout pages with identifiers printed in the form of barcodes.

As described above, in one embodiment, processing involving the generation of the unique identifiers and the storage of the identifiers and representations of the items to be printed is performed when handouts are printed. This is usually done before the occurrence of the presentation for which handouts are prepared. It should be noted however that printing of handouts is not required for generation of the unique identifiers and the storage of the identifiers and representations of the items to be printed.

In alternative embodiments, generation of unique identifiers for the items to be printed, obtaining representations of the items to be printed, and storage of the identifiers and representations may be performed in various other situations prior to occurrence of the presentation without requiring handouts to be printed. For example, in one embodiment, prior to occurrence of a presentation, a user may provide information identifying a set of items to be printed on a handout. The information identifying the set of items may then be used to generate unique identifiers for the items to be printed, to obtain representations of the items to be printed, and to store the identifiers and representations. This can be done independent of the printing of the handouts.

In other embodiments, all the processing may be performed after occurrence of the presentation. For example, a signal to print a handout for a presentation may be received after the presentation has occurred. Generation of unique identifiers for the items to be printed, storage of representations of the items, and printing of the handouts may then be performed responsive to the signal. The printing of the handouts is however not necessary.

The presentation for which the handout is prepared may then occur and presentation materials prepared by the user may then be output or presented during the presentation. Various different types of output devices 116 may be used to output information during the presentation. For example, a computer laptop attached to a display screen may be used to display slides from a *.ppt file. The slides may be displayed while the presenter is giving the presentation. Other types of information may also be output during the presentation. For example, the presenter may talk about or discuss contents of a slide that is being displayed. Other attendees of the presentation may also provide their input during the presentation.

Capture devices 118 are configured to capture information presented at a presentation. Various different types of information output during a presentation may be captured or recorded by capture devices 118 including audio information, video information, images of slides or photos, whiteboard information, text information, and the like. For purposes of this application, the term "presented" is intended to include displayed, output, spoken, etc. For purposes of this application, the term "capture device" is intended to refer to any device, system, apparatus, or application that is configured to capture or record information of one or more types. Examples of capture devices 118 include microphones, video cameras, cameras (both digital and analog), scanners, presentation recorders, screen capture devices (e.g., a whiteboard information capture device), symbolic information capture devices, etc. In addition to capturing the information, capture devices 118 may also be able to capture temporal information associated with the captured information.

A presentation recorder is a device that is able to capture information presented during a presentation, for example, by tapping into and capturing streams of information from an information source. For example, if a computer executing a PowerPoint™ application is used to display slides from a *.ppt file, a presentation recorder may be configured to tap into the video output of the computer and capture keyframes every time a significant difference is detected between displayed video keyframes of the slides. The presentation recorder is also able to capture other types of information such as audio information, video information, slides information stream, etc. The temporal information associated with the captured information indicating when the information was output or captured is then used to synchronize the different types of captured information. Examples of presentation recorders include a screen capture software application, a PowerPoint™ application that allows recording of slides and time elapsed for each slide during a presentation, presentation records described in U.S. application Ser. No. 09/728,560, filed Nov. 30, 2000 (Attorney Docket No. 15358-006210US), U.S. application Ser. No. 09/728,453, filed Nov. 30, 2000, and U.S. application Ser. No. 09/521,252, filed Mar. 8, 2000

A symbolic information capture device is able to capture information stored in symbolic presentation documents that may be output during a presentation. For example, a symbolic information capture device is able to record slides presented at a presentation as a sequence of images (e.g., as JPEGs, BMPs, etc.). A symbolic information capture device may also be configured to extract the text content of the slides. For example, during a PowerPoint™ slide presentation, a symbolic information capture device may record the slides by capturing slide transitions (e.g., by capturing keyboard commands) and then extracting the presentation images based on these transitions. Whiteboard capture devices may include devices such as a camera appropriately positioned to capture contents of the whiteboard, a screen, a chart, etc.

The information captured or recorded by capture devices 118 during a presentation may be stored in a repository or database 115 as recorded information 120. Recorded information 120 may be stored in various formats. For example, a directory may be created in repository 115 for storing recorded information 120, and the various types of information (e.g., audio information, video information, images, etc.) included in recorded information 120 may be stored in the directory. In another embodiment, recorded information 120 may be stored as a file. Various other techniques known to those skilled in the art may also be used for storing the recorded information.

According to an embodiment of the present invention, recorded information 120 or portions thereof may also be forwarded to server 112 for further processing, or alternatively server 112 may access recorded information 120 from repository 115. For each item printed on the handout for the presentation and having a unique identifier associated with it, server 112 is configured to process recorded information 120 to determine the times during the presentation when information related to the printed item was presented. For example, if the handout for the presentation comprises a set of slides for which unique identifiers have been generated and stored when the handout was printed (as described above), server 112 is configured to determine when each slide in the set of printed slides was output (e.g., displayed on a screen) during the presentation. As another example, if the printed handout comprised a list of agenda topics to be discussed during a meeting, and a unique identifier has been generated for each agenda topic, then server 112 is configured to process the recorded information to determine when the various printed agenda topics were discussed during the meeting. As described below in further detail, various different techniques may be used for determining when an item printed in a handout for a presentation was presented during the presentation. According to an embodiment of the present invention, information 114 comprising information identifying the unique identifiers and representations of the printed items previously stored by server 112 is used to facilitate determination of time information for each printed item indicative of when the printed item was presented during the presentation.

Server 112 is configured to store the time information determined for the various printed items that indicates when the printed items were presented during the presentation. According to an embodiment of the present invention, the information is stored in the form of an XML structure. For example, the time information may be stored in XML structure 114 that was previously stored by server 112. According to an embodiment of the present invention, time information may be stored for only those slides that were actually presented during the presentation.

According to an embodiment of the present invention, the stored information (which may be stored in the form of a XML structure), including information related to the unique identifiers, representations of the printed items, and time information determined for the various printed items as to when the printed items were presented during a presentation, enables a user to index into or access the recorded information for a presentation (or portions thereof) using the paper document handout. Accordingly, the user can access the recorded information using a paper interface.

Embodiments of the present invention enable a user to access or retrieve portions of the recorded information for a presentation corresponding to a particular printed item printed on a handout for the presentation. For example, if a slide is printed on a page of a handout for a particular presentation, a user can use that page to access portions of the information recorded for the particular presentation during which the slide was displayed. Various different types of information included in the recorded information may be accessed by the user corresponding to when the slide was displayed including audio information, video information, and various other types of information. The type of information that is accessed by the user may be user-selectable. Further details related to how a user can access portions of the recorded information using a paper document handout are discussed below.

A user may also use the paper handout to specify actions to be performed on the accessed or retrieved information. Examples of actions that can be performed include outputting the information, saving the information, communicating the information, printing the information, etc. Details related to how a user can specify actions to be performed are described below.

Figure 2:
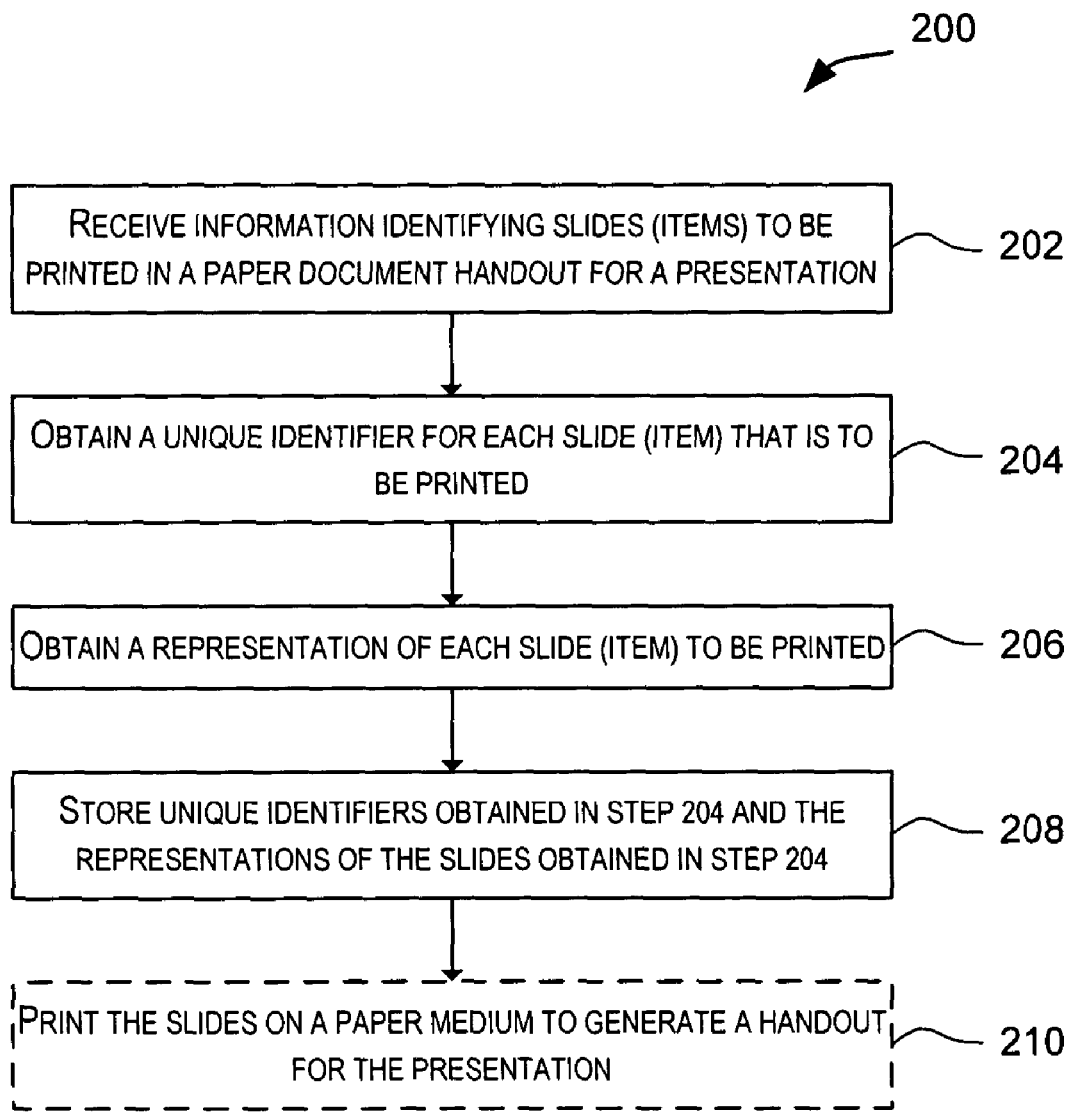
FIG. 2 is a simplified high-level flowchart depicting a method of processing performed prior to occurrence of a presentation according to an embodiment of the present invention.

FIG. 2 is a simplified high-level flowchart 200 depicting a method of processing performed prior to occurrence of a presentation according to an embodiment of the present invention. The method depicted in FIG. 2 may be performed by software modules executed by a processor, hardware modules, or combinations thereof. For example, in the embodiment depicted in FIG. 1, the processing may be performed by software modules executed by server 112. Flowchart 200 depicted in FIG. 2 is merely illustrative of an embodiment of the present invention and is not intended to limit the scope of the present invention. Other variations, modifications, and alternatives are also within the scope of the present invention.

For sake of description, the processing depicted in FIG. 2 assumes that the items to be printed on a handout are slides from a *.ppt file created using a PowerPoint™ application. It should be apparent that processing depicted in FIG. 2 can also be applied to other types of items (e.g., agenda topics, photos, etc.) that are to be printed in a handout for a presentation.

As previously described, according to an embodiment of the present invention, processing depicted in FIG. 2 may be triggered when a handout is to be printed for a presentation. For example, the processing may be triggered when printer 108 (depicted in FIG. 1) receives a signal to print a handout. Responsive to the print signal, printer 112 may send a signal to server 112 identifying the items to be performed. Server 112 may then initiate the processing depicted in FIG. 2. In alternative embodiments, the processing depicted in FIG. 2 may also be performed by printer 112.

In alternative embodiments, the processing may also be performed independent of the handout printing process. For example, the processing may be initiated upon receiving information identifying the items to be printed in the handout for a presentation.

Accordingly, as depicted in FIG. 2, in step 202, information identifying the slides to be printed in a paper document handout for a presentation is received. The information received in step 202 may also include information identifying the source of the slides to be printed. For example, the information may include the name of the PowerPoint™ file containing the slides and the location where the file is stored. Other information related to the slides such as information indicative of the pages on which the slides are located within the PowerPoint™ file may also be received in step 202.

In step 204, a unique identifier is then obtained/generated for each slide that is to be printed. Various different types of identifiers may be used such as text string identifiers, numerical identifiers, barcodes, etc. In certain embodiments, the slide itself (or an image of the slide) may be used as unique identifier for the slide. According to an embodiment of the present invention, a numerical identifier (e.g., a 10-digit identifier) is obtained for each slide to be printed. A portion of the identifier (e.g., the most significant 5 digits) is used to represent a presentation identifier that identifies a presentation for which the handout is to be generated. It should be noted that it is possible for two different presentations to be identified by the same presentation identifier. For example, if a lecture is presented in the morning and the same lecture is repeated in the afternoon and the same handouts are to be used for the two lectures, the same presentation identifier may be used to identify the two lectures. In alternative embodiments, two separate identifiers may be generated for the two lectures. Another portion of the identifier (e.g., the least significant 5 digits) uniquely identifies each slide that is to be printed.

In step 206, a representation of each slide (item) to be printed is obtained. According to an embodiment of the present invention, an image (e.g., a JPG image, a BMP image, etc.) of a slide acts as the representation of the slide. For example, a PowerPoint™ application has the capability to output JPEG images of slides in a *.ppt file. These images may be used as representations of the slides. Other representations of slides may also be used in alternative embodiments.

In general, the representation for an item to be printed depends on the nature of the item. For example, for text information related to a meeting agenda point, the representation may be a string identifying the agenda point. Various other types of representations may also be used within the scope of the present invention.

In step 208, the unique identifiers obtained in step 204 are correlated to the representations of the slides for which the identifiers are obtained, and information related to the identifiers and the representations is stored. According to an embodiment of the present invention, the information is stored in the form of a XML structure. Various other formats may also be used for storing the information. Other information related to the slides may also be stored. For example, information identifying the source file of the slides, the pages of the slides within the source files, etc. may also be stored.

In embodiments where the processing depicted in FIG. 2 is initiated upon receiving a signal to print one or more paper document handouts for a presentation, the handouts are generated in step 210 by printing the items identified in step 202 on a paper medium. One or more paper document handouts may be printed. Each handout may comprise one or more pages. Each page may have one or more slides (items) printed on it. The handouts may have other information printed on them in addition to the slides (items) identified in step 202.

According to an embodiment of the present invention, for each printed item, the unique identifier corresponding to the item is also printed on the handout. Each unique identifier is generally printed proximal to the printed item to which the identifier corresponds such that a user of the paper handout can easily discern the printed item with which an identifier is associated. The unique identifiers may be printed in different formats such as barcodes, alphanumerical strings, images, etc.

In other embodiments wherein printing of handouts is performed independent of the processing depicted in FIG. 2, step 210 may not be performed. The handouts may be printed at some later time, before the presentation, during the presentation, or even after the presentation. Whenever the handouts are printed, the unique identifiers are also printed in the handouts. Accordingly, steps 202, 204, 206, and 208 are generally performed before the occurrence of the presentation for which a handout is generated, while step 210 may be performed before the presentation, during the presentation, or even after the presentation. In other embodiments, all the steps depicted in FIG. 2 may be performed after occurrence of a presentation.

At the time the handouts are printed, the unique identifiers or barcodes that are printed on the handout do not imply, indicate, or encapsulate any time information. Each identifier or barcode simply identifies an item (e.g., a slide) that is printed in the handout.

FIG. 3A depicts a simplified page 300 from a paper document handout generated according to an embodiment of the present invention. Page 300 depicted in FIG. 3 is merely illustrative of an embodiment incorporating the present invention and does not limit the scope of the invention as recited in the claims. One of ordinary skill in the art would recognize other variations, modifications, and alternatives.

As depicted in FIG. 3A, information 302 identifying the presentation and the presenter is printed on the handout page. Other information such as the time when the presentation is to take place, the place where the presentation is to take place, etc. may also be included in information 302. In the embodiment depicted in FIG. 3A, three slides (items) 304-1, 304-2, and 304-3 have been printed on the page. A barcode 306 is also printed for each slide. Each barcode encapsulates a unique identifier for its corresponding slide. Spaces 308 are provided for the user to take notes during the presentation for each slide.

A box 310 is also printed for each slide. A user of a handout can mark box 310 for a particular slide to specify that the user is interested in accessing or retrieving, and possibly performing actions, on portions of information recorded at the presentation during which that particular slide was displayed.

Figure 3B:
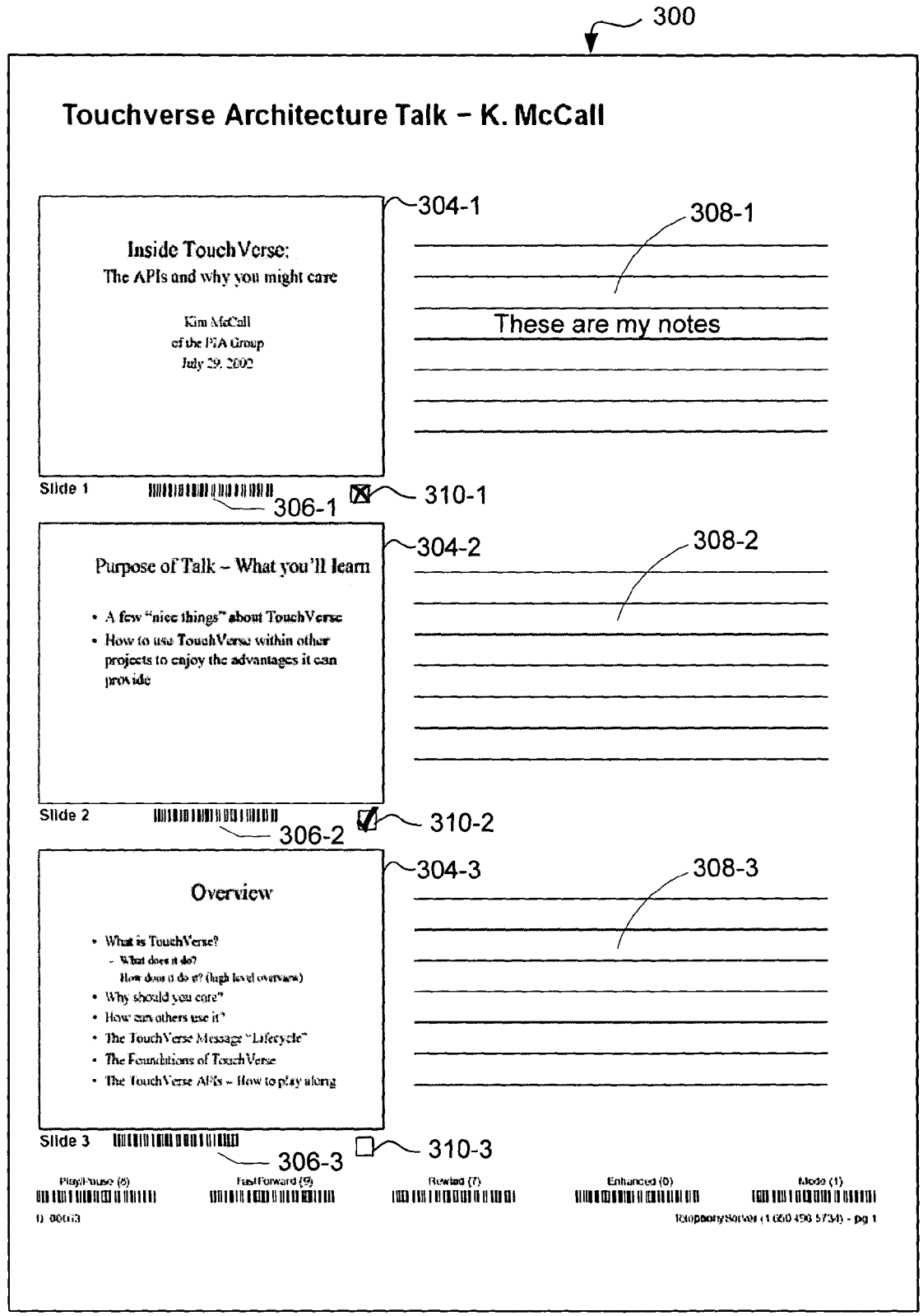
FIG. 3B depicts the page shown in FIG. 3A with user markings according to an embodiment of the present invention.

FIG. 3B depicts page 300 shown in FIG. 3A with user markings according to an embodiment of the present invention. As depicted in FIG. 3B, the user has written notes on the handout in space 308-1. The user has also marked boxes 310-1 and 310-2 thereby indicating that the user is interested in accessing information corresponding to slides 304-1 and 304-2.

FIG. 4A depicts a simplified page 400 from a paper document handout generated according to an embodiment of the present invention. Page 400 depicted in FIG. 4 is merely illustrative of an embodiment incorporating the present invention and does not limit the scope of the invention as recited in the claims. One of ordinary skill in the art would recognize other variations, modifications, and alternatives.

Page 400 depicted in FIG. 4A includes many of the features of page 300 depicted in FIG. 3A. For example, references 402, 404, 406, and 408 are similar to references 302, 304, 306, and 308 depicted in FIG. 3A. In addition, a set of boxes 410 is printed for each slide. Each box in a set of boxes 410 corresponds to a particular type of information. For example, in the embodiment depicted in FIG. 4A, each set comprises two boxes 410-a and 410-b. Box 410-a corresponds to audio information and box 410-b corresponds to video information. A user of the handout can mark one or more boxes from the set of boxes to specify the type of information which the user would like to access or retrieve for a particular slide. Accordingly, page 400 depicted in FIG. 4A not only allows the user to select slides of interest to the user but also allows a user of a handout to select the type of information the user would like to access for a selected slide.

Page 400 depicted in FIG. 400 does not contain boxes corresponding to boxes 310 depicted in page 300 of FIG. 3A. This is because selection of one or more boxes from a set of boxes 410 automatically indicates that the user is interested in accessing information for the slide corresponding to the set of boxes 410. Accordingly, the selection of a slide is automatically implied by selection of a box from set of boxes 410. However, in other embodiments of the present invention, boxes 310 and set of boxes 410 may both be printed on pages of a handout.

Figure 4B:
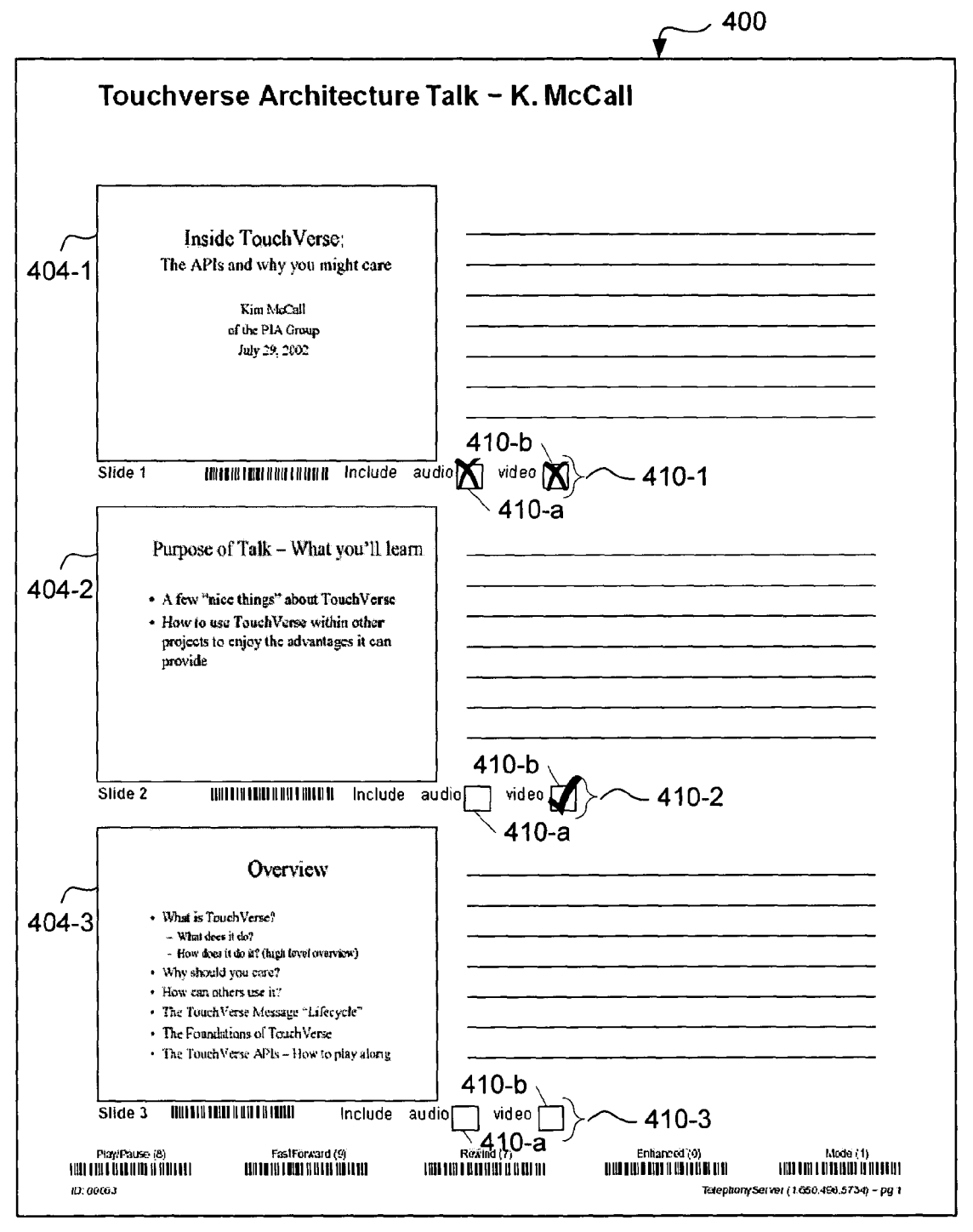

FIG. 4B depicts page 400 shown in FIG. 4A with user markings according to an embodiment of the present invention. As depicted in FIG. 4B, the user has marked box 410-a and box 410-b from set 410-1 corresponding to slide 404-1 and box 410-b from set 410-2 corresponding to slide 404-2. This indicates that the user is interested in accessing both audio and video information corresponding to slide 404-1 and only video information corresponding to slide 404-2.

FIG. 5A depicts a simplified page 500 from a paper document handout generated according to an embodiment of the present invention. Page 500 depicted in FIG. 5 is merely illustrative of an embodiment incorporating the present invention and does not limit the scope of the invention as recited in the claims. One of ordinary skill in the art would recognize other variations, modifications, and alternatives.

Page 500 depicted in FIG. 5A includes many of the features of page 400 depicted in FIG. 4A. For example, references 502, 504, 506, 508, and 510 are similar to references 402, 404, 406, 408, and 410 depicted in FIG. 4A. In addition, a second set of boxes 512 is printed for each slide. Each box in the second set of boxes corresponds to an action to be performed. For example, in the embodiment depicted in FIG. 5A, each second set 512 comprises two boxes 512-a and 512-b. Box 521-a corresponds to the action of outputting the information and box 512-b corresponds to the action of communicating the information to a pre-specified user. In the embodiment shown in FIG. 5A, the communication is done via email. A user of the handout can mark one or more boxes from the second set of boxes to specify the actions to be performed on information retrieved corresponding to a particular user-selected slide. Accordingly, page 500 depicted in FIG. 5A not only allows the user to select slides of interest to the user and the type of information to be retrieved for each slide of interest, but to specify actions to be performed on the retrieved types of information for the selected slides.

Figure 5B:
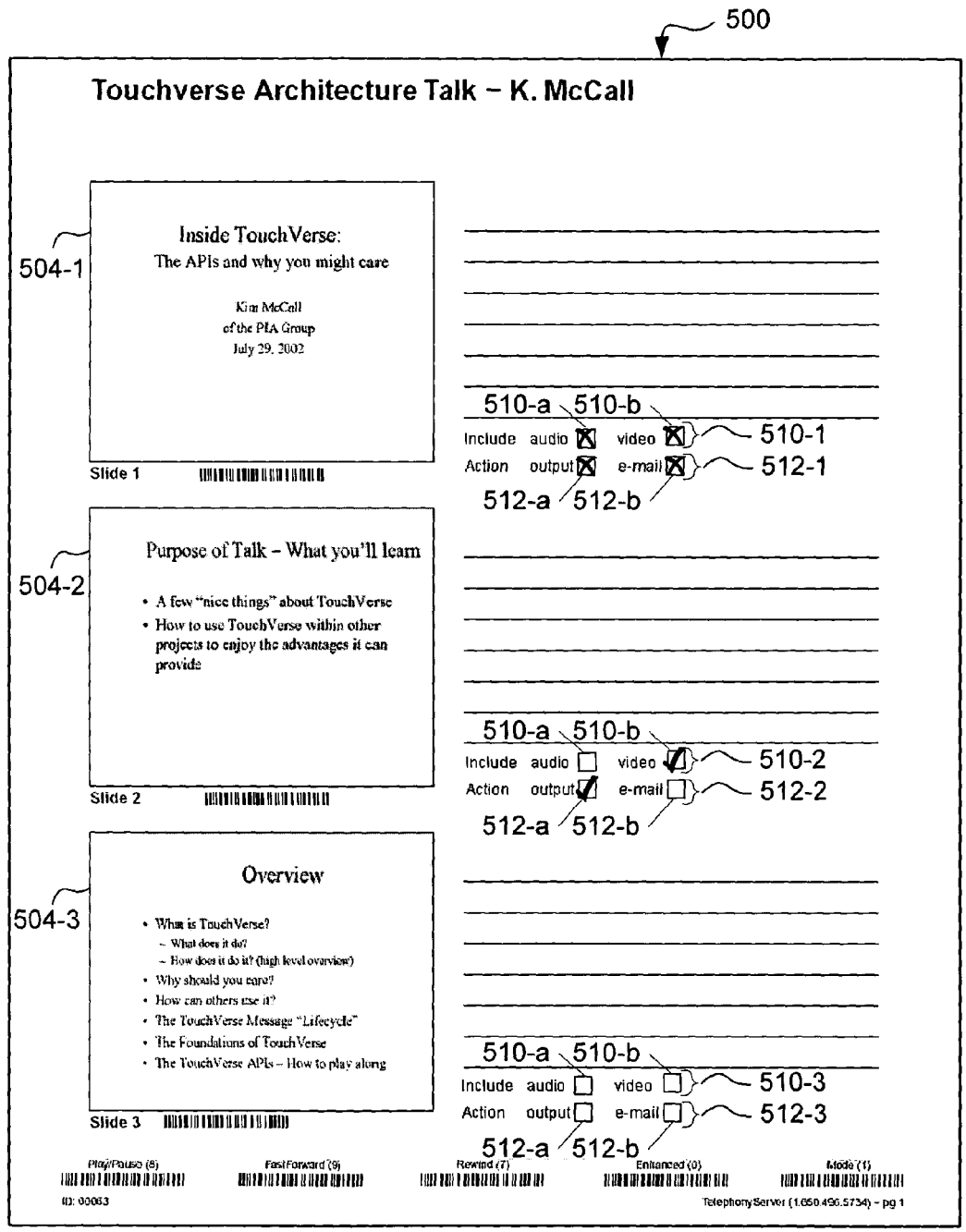
FIG. 5B depicts the page shown in FIG. 5A with user markings according to an embodiment of the present invention.

FIG. 5B depicts page 500 shown in FIG. 5A with user markings according to an embodiment of the present invention. As depicted in FIG. 5B, the user has marked the box 512-a and box 512-b from set 512-1 corresponding to slide 504-1 and box 512-a from set 512-2 corresponding to slide 504-2. This indicates that the user is interested in both outputting and communicating the audio and video information corresponding to slide 504-1 and outputting the video information corresponding to slide 504-2.

Figure 6:
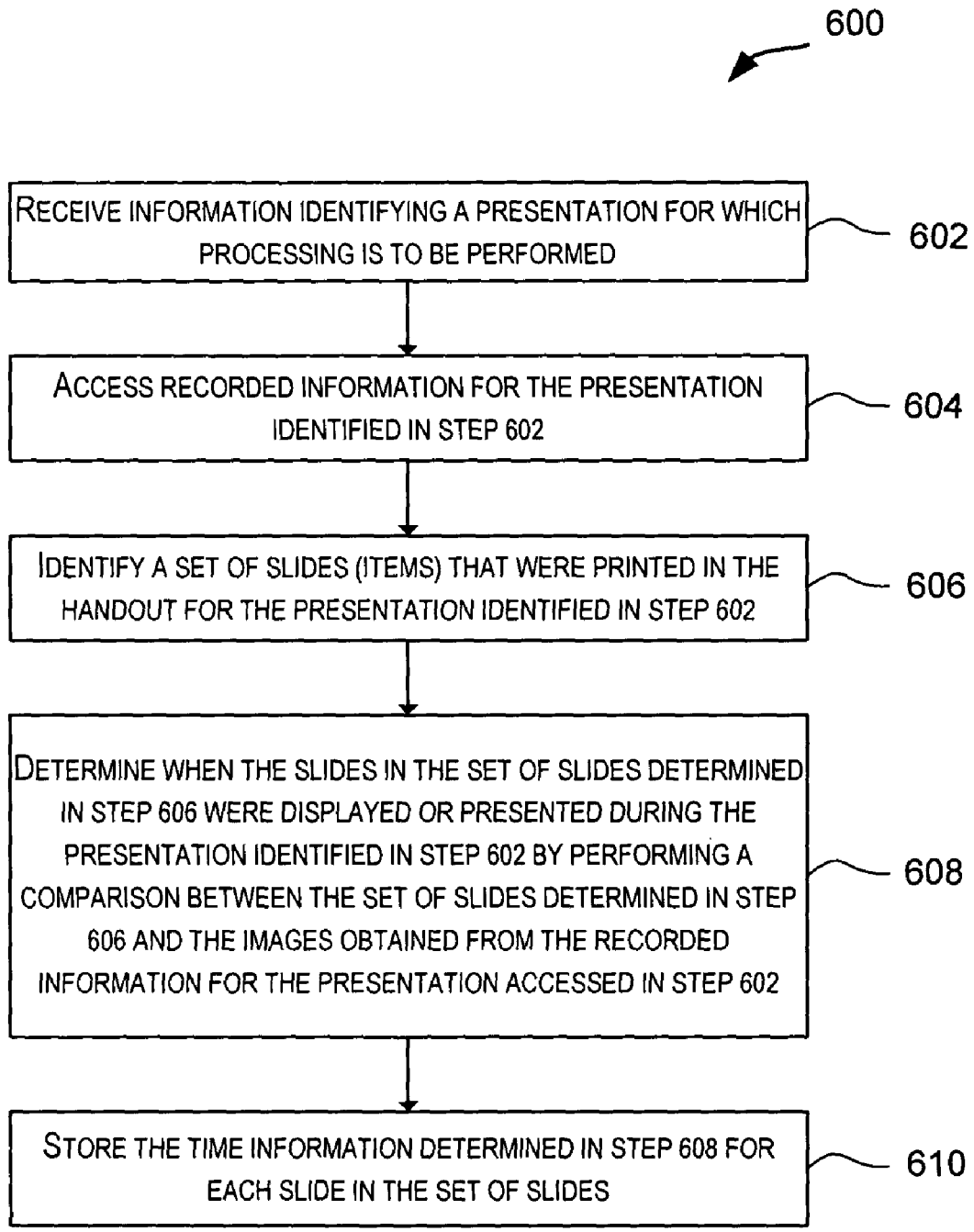
FIG. 6 is a simplified high-level flowchart depicting a method of processing the recorded information for a presentation to determine when items printed on a handout for the presentation were presented during the presentation according to an embodiment of the present invention.

FIG. 6 is a simplified high-level flowchart 600 depicting a method of processing the recorded information for a presentation to determine when items printed on a handout for the presentation were presented during the presentation according to an embodiment of the present invention. The method depicted in FIG. 6 may be performed by software modules executed by a processor, hardware modules, or combinations thereof. For example, in the embodiment depicted in FIG. 1, the processing may be performed by software modules executed by server 112. Flowchart 600 depicted in FIG. 6 is merely illustrative of an embodiment of the present invention and is not intended to limit the scope of the present invention. Other variations, modifications, and alternatives are also within the scope of the present invention.

For sake of description, the processing depicted in FIG. 6 assumes that the items printed (or to be printed) on a handout are slides from a *.ppt file created using a PowerPoint™ application. It should be apparent that processing depicted in FIG. 6 can also be applied to other types of items (e.g., agenda topics, photos, etc.) that are printed in the handout for a presentation.

As depicted in FIG. 6, the processing is initiated upon receiving information in step 602 identifying a presentation for which processing is to be performed. The information received in step 602 may comprise a presentation identifier that identifies a particular presentation. Other types of information, for example, "Meeting conducted on Jun. 30, 2003 in conference room Alpha at 1:00pm", may also be used to identify a presentation. The information may be mapped to a presentation identifier. The information received in step 602 may also identify the storage location where recorded information for the presentation is stored.

In step 604, recorded information for the presentation identified in step 602 is accessed. As stated above, information identifying the storage location for the presentation may be received in step 602.

In step 606, a set of slides that were printed in the handout for the particular presentation identified in step 602 is determined. The presentation identifier received in step 602 may be used to identify the set of slides. The presentation identifier may be used to lookup a table storing presentation identifiers and information identifying slides printed for the presentation. For example, as described above, according to an embodiment of the present invention, information related to unique identifiers for slides printed in a handout for a presentation and representative images of the slides is stored per the processing depicted in FIG. 2. For example, information for slides printed for a presentation may be stored in a XML structure. A plurality of such XML structures may be stored for the various presentations. Further, as described above, according to an embodiment of the present invention, a unique identifier for a printed slide includes a portion indicative of a presentation identifier identifying a presentation. According to an embodiment of the present invention, the presentation identifier received (or determined) in step 602 is compared with the unique identifiers stored in the various XML structures to identify a XML structure that stores information for slides printed in the handout for the presentation. The set of slides printed for the presentation can then be determined from the XML structure.

In alternative embodiments, information related to multiple presentations may be stored together in a single data structure (e.g., a single XML structure). In this embodiment, in step 606, the presentation identifier for the presentation identified in step 602 is compared with the various unique identifiers to find unique identifiers corresponding to slides that were printed in a handout for that particular presentation. In this manner the set of slides printed for the presentation can be determined.

In step 608, the times when the slides in the set of slides were displayed or presented during the presentation identified in step 602 are determined. According to an embodiment of the present invention, this is done by first extracting images from the recorded information accessed in step 604. The images that are extracted from the recorded information may include images captured during the presentation by various image capture devices, images captured by a presentation recorder, keyframe images obtained from video information captured during the presentation, and the like.

The extracted images are then compared with images (representations) of the slides printed on the handout for the presentation. According to an embodiment of the present invention, the representations (i.e., images of the slides) of the slides stored in the XML structure are used for the comparison. Various content matching techniques may be used for comparing the images of slides stored in the XML structure and the images extracted from the recorded information for the presentation to find matching images. Examples of such content matching techniques are described in U.S. Provisional Application No. 60/462,412, and U.S. application Ser. No. 10/412,757, the entire contents of which are herein incorporated by reference for all purposes. Other techniques known to those skilled in the art may also be used.

Based upon the comparisons performed in step 608, time information is determined for each slide that is printed on the handout for the presentation indicating the time(s) during the presentation when the slide was displayed or presented. The temporal information associated with the recorded information is used to determine the time information for each printed slide.

Various different techniques may be used for determining the time information for each printed slide. According to one technique, for each printed slide, the image representation of the slide is compared with images extracted from the recorded information to determine images from the recorded information that match the printed slide image. As previously stated, content matching techniques described in U.S. Provisional Application No. 60/462,412 and U.S. application Ser. No. 10/412,757 and other techniques known to those skilled in the art may be used to find matching images (i.e., images from the recorded information that comprise the printed slides). Based upon the matching images determined from recorded information and the temporal information associated with the matching images, the time information for a printed slide can be determined.

According to an embodiment of the present invention, the time information for a printed slide identifies a time during the presentation when the slide was displayed. The time information for a printed slide may also identify one or more spans of time during the presentation when the slide was presented or displayed. The spans of time may be non-contiguous.

In step 610, the time information determined in step 608 for each printed slide is stored. In alternative embodiments, the time information may be stored only for those slides that were determined to be presented at the presentation. According to an embodiment of the present invention, the time information is stored in the XML structure for the presentation determined in step 606. The time information is stored in a manner such that is it correlated with the unique identifiers for the printed slides, and also possibly the representative images of the printed slides. Accordingly, given a unique identifier for a slide, the time information for that slide for a presentation can be determined.

In addition to the time information, information identifying the location where the recorded information for the presentation is stored may also be stored. According to an embodiment of the present invention, the information is stored in the XML structure. This storage location information for the recorded information may be updated when the recorded information is moved to a new storage location. In this manner, embodiments of the present invention allow the storage location of the recorded information to be changed over time.

The processing depicted in FIG. 6 may be automatically performed after the information for a presentation has been recorded. The time information stored as a result of the processing performed in FIG. 6 enables a user to access portions of the recorded information using the paper document handout.

In alternative embodiments, the processing depicted in FIG. 6 may be performed upon receiving a signal indicating that a user of a handout, using the handout, has requested access to information corresponding to one or more slides printed on the handout that the user has selected. As described below, there are various ways in which this signal may be received. In these alternative embodiments, the processing depicted in FIG. 6 may be performed for only those slides selected by the user. Whether to perform the processing automatically after the information for a presentation has been recorded or responsive to receiving a user's request to access portions of the recorded information depends upon computing resources available for the processing and the and allowable time constraints for the processing.

Figure 7A:
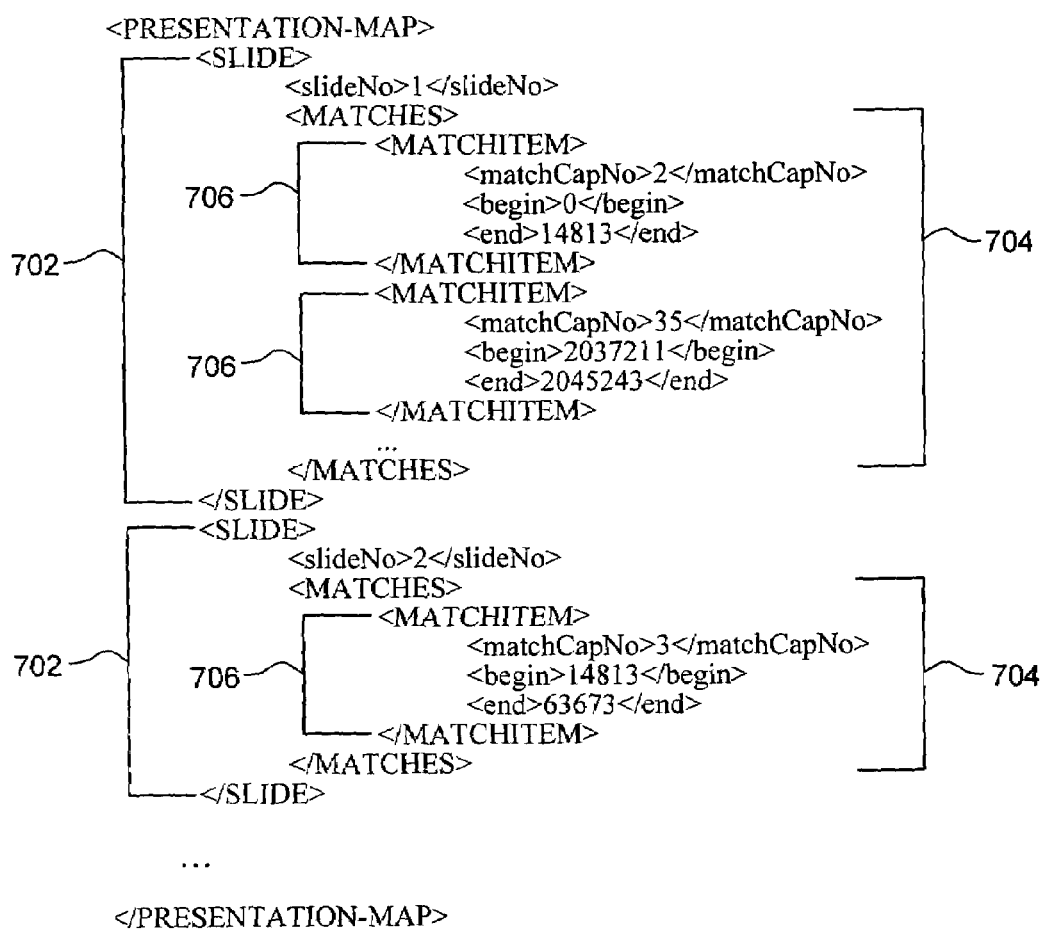
FIG. 7A is a simplified diagram of a XML structure according to an embodiment of the present invention that is used to store time information for a set of slides printed on a handout for a presentation.

FIG. 7A is a simplified diagram of a XML structure according to an embodiment of the present invention that is used to store time information for a set of slides printed on a handout for a presentation. The embodiment depicted in FIG. 7A may also be used for storing information for other types of printed items in alternative embodiments of the present invention.

As depicted in FIG. 7A, information 702 (delineated by tags <SLIDE> and </SLIDE>) is stored for each slide printed in a handout. Each slide is identified by a slide number (delineated by tags <slideNo> and </slideNo>). For each slide, information 704 (delineated by tags <MATCHES> and </MATCHES>) is stored for a set of images from the recorded information that matched the slide. Information 704 comprises information 706 (delineated by tags <MATCHITEM> and </MATCHITEM>) for each matching image from the recorded information. For each matching image, an identifier (delineated by tags <matchCapNo> and </matchCapNo>) is stored corresponding to the potion of the recorded information when the image was shown or presented. For each matching image, a start time or start index point (delineated by tags <begin> and </begin>) of the portion of information for the image and an end time of end index point (delineated by tags <begin> and </begin>) of the portion of information for the image is stored. The begin and end times indicate a portion of the recorded information when the corresponding slide was presented or displayed. For example, in the embodiment depicted in FIG. 7A, information corresponding to slide #1 was shown or presented between times 0–14813 and times 2037211–2045243 of the recorded information. The start and end times may be relative to the start of the recorded information.

According to an embodiment of the present invention, the unique identifier for a slide also includes the name of the directory when the XML file (such as that shown in FIG. 7A) is stored. In this embodiment, another XML table is stored that links the XML file depicted in FIG. 7A to the recorded information referenced in the XML file.

In alternative embodiments, the XML structure depicted in FIG. 7A may be extended to include information identifying the type of information that is stored for each slide and the location where the information is stored. An example of an extended XML structure is depicted in FIG. 7B. For example, as depicted in FIG. 7B, slide#1 was presented during two segments of the information recorded during a presentation. The first segment is of type audio information (occurring between time 0 and 14813) and stored in "rtsp://somewhere.com/audio.rm". The second segment is of type video information (occurring between time 2037211 and 2045243) and stored in "rtsp://somewhere.com/video.rm".

The XML structures depicted in FIGS. 7A and 7B depict techniques for storing information for the printed items according to an embodiment of the present invention. Various other techniques (e.g., databases, tables, other data structures, memory structures, etc.) may also be used in alternative embodiments of the present invention.

Figure 8:
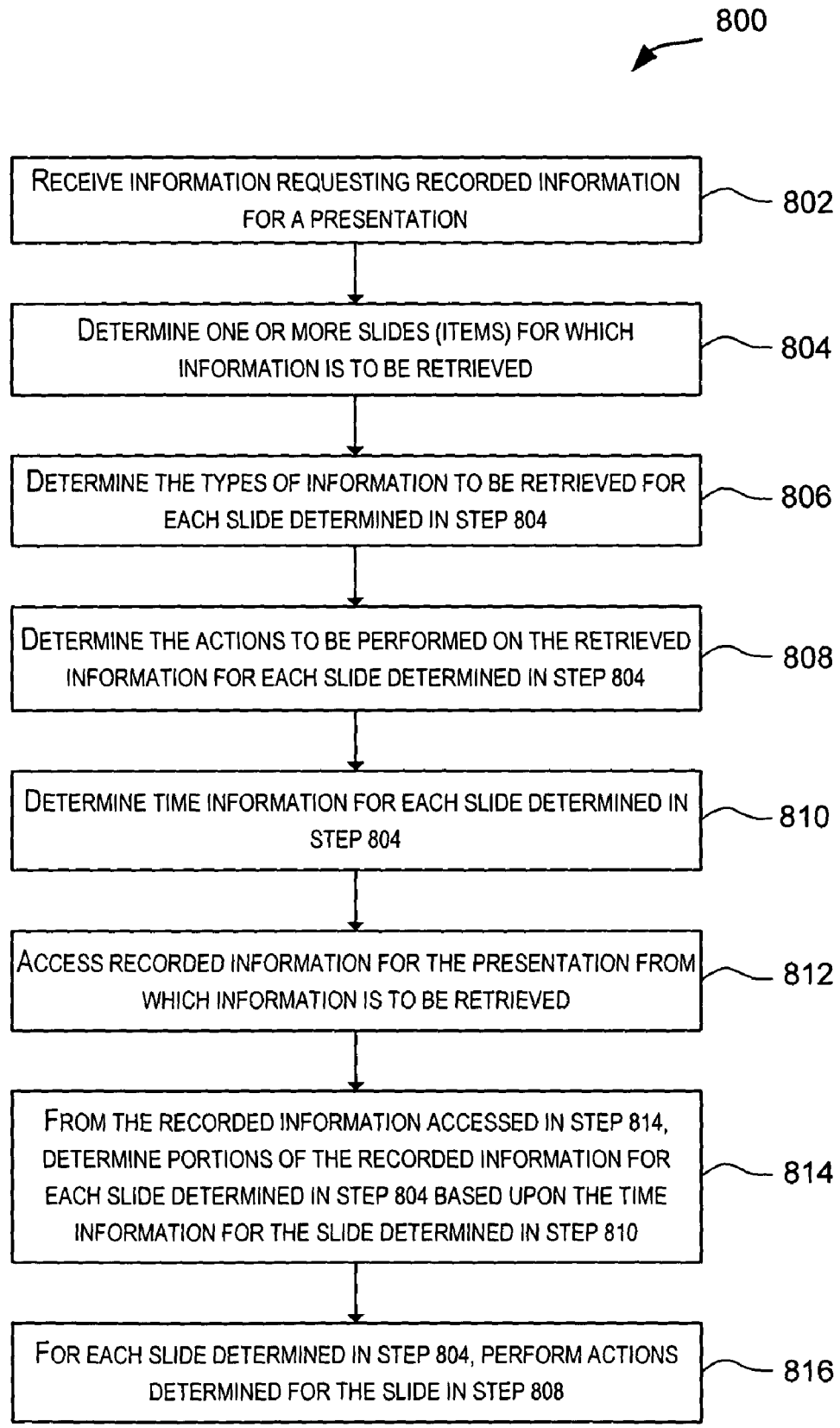
FIG. 8 is a simplified high-level flowchart depicting a method of accessing and performing actions on information recorded for a presentation according to an embodiment of the present invention.

According to the teachings of the present invention, a user of a handout can use the handout to access or retrieve information recorded for the presentation for which the handout was printed. FIG. 8 is a simplified high-level flowchart 800 depicting a method of accessing and performing actions on information recorded for a presentation according to an embodiment of the present invention. The method depicted in FIG. 8 may be performed by software modules executed by a processor, hardware modules, or combinations thereof. For example, in the embodiment depicted in FIG. 1, the processing may be performed by software modules executed by server 112. Flowchart 800 depicted in FIG. 8 is merely illustrative of an embodiment of the present invention and is not intended to limit the scope of the present invention. Other variations, modifications, and alternatives are also within the scope of the present invention.

For sake of description, the processing depicted in FIG. 8 assumes that the items printed (or to be printed) on a handout are slides. It should be apparent that processing depicted in FIG. 8 can also be applied to other types of items (e.g., agenda topics, photos, etc.) that are printed in the handout for a presentation.

As depicted in FIG. 8, the process is initiated when information requesting recorded information for a presentation is received in step 802. The request may be received using various different techniques and in response various different stimuli. According to one technique, a user of a handout may use a barcode scanner to scan the barcode(s) printed on the handout corresponding to slide(s) for which the user would like to access or retrieve information. For example, given a page, such page 300 depicted in FIG. 3A, a user may use a barcode scanner to scan one or more barcodes 306 of slides of interest to the user. For example, if the user is interested in accessing portions of recorded information for slides 304-1 and 304-2, the user may scan barcodes 306-1 and 306-2. The request to access the information in step 802 may be generated responsive to the scanning.

As described earlier, the user may identify slides of interest to the user by making markings on the paper handout itself. For example, for handout page 300 depicted in FIG. 3A, the user may mark boxes 310 to identify slides of interest. For example, as depicted in FIG. 3B, the user has marked boxes 310-1 and 310-2 indicating that the user is interested in accessing portions of the recorded information for the presentation corresponding to the selected slides. In this embodiment, the user does not need any special equipment such as a barcode scanner to identify slides for which the user would like to access information. The paper handout with the marked pages (or just those pages of the handout that the user has marked) may then be provided to a device that is capable of scanning the pages (or obtaining pictures or images of the pages) to identify which slides (or items in general) have been selected by the user. Various tools and techniques may be used for scanning or obtaining images of the pages. For example, various scanning programs, image processing programs, barcode recognition programs, optical mark recognition programs (e.g., programs provided by scanssoft.com), etc. may be used to scan or receive images of pages and to recognize marks by the user on the pages.

In step 804, the one or more slides for which information is to be retrieved are determined. The determination may be made based upon information received in step 802. For example, if the user has used a barcode scanner to identify slides for which information is to be retrieved, each scanned barcode identifies a slide for which information is to be retrieved. Each scanned barcode also identifies the unique identifier corresponding to a selected slide. In some other embodiments, as described above, the marked pages of a handout may be provided to a device that is capable of determining the slides for which information is to be retrieved based upon markings made by the user on the handout pages. In this embodiment, the device may obtain images of the pages of the handout, analyze the images to determine the user markings, and determine the selected slides based upon the user markings. The unique identifiers for the selected slides are also determined.

As described earlier, certain embodiments of handouts may allow the user to specify, for each selected slide, the type of information that the user would like to retrieve for the slide. For example, page 400 depicted in FIG. 4A provides boxes 410 that a user may mark to specify a type of information corresponding to a selected slide that the user is interested in accessing. For example, as depicted in FIG. 4B, the user has marked boxes 412-*a* and 410-*b* from set 410-1 corresponding to slide 404-1 and box 410-*b* from set 410-2 corresponding to slide 404-2, thereby indicating that the user is interested in accessing both audio and video information corresponding to slide 404-1 and only video information corresponding to slide 404-2.

Accordingly, in embodiments of the present invention that allow a user of a handout to specify the types of information to be retrieved for each selected slide, in step 806, for each selected slide determined in step 804, the types of information to be retrieved for the slide are determined. According to an embodiment of the present invention, the determination in step 806 may be made based upon information received in step 802. For example, barcodes corresponding to the types of information may be printed on the pages of the handout for each slide. The user may then use a scanner to scan one or more barcodes, for each selected slide for which information is to be retrieved, corresponding to the type of information to be retrieved. In embodiments where the handout or marked pages thereof are provided to a device, the device is capable of determining the type of information to be retrieved for each selected slide based upon markings made by the user on the handout pages. In these embodiments, the device may obtain images of the pages of the handout, analyze the images to determine the user markings, and determine the selected types of information based upon the user markings.

As described earlier, certain embodiments of handouts also allow the user to specify one or more actions to be performed on the retrieved information. For example, page 500 depicted in FIG. 5A provides boxes 512 that a user may mark to specify an action to be performed on the information retrieved for a selected slide. For example, as depicted in FIG. 5B, the user has marked the boxes 512-*a* and 512-*b* from set 512-1 corresponding to slide 504-1 and box 512-*a* from set 512-2 corresponding to slide 504-2 thereby indicating that the user is interested in both outputting and communicating the audio and video information that has been retrieved for slide 504-1 and outputting the video information that is retrieved for slide 504-2.

Accordingly, in embodiments of the present invention that allow a user of a handout to specify actions to be performed, in step 808, for each selected slide determined in step 804, the actions to be performed on information to be retrieved for the slide are determined. According to an embodiment of the present invention, the determination in step 808 may be made based upon information received in step 802. For example, barcodes corresponding to actions to be performed may be printed on the pages of the handout for each slide. The user may then use a scanner to scan one or more barcodes for each selected slide to specify the actions to be performed on information retrieved for the slide. In embodiments where the handout or marked pages thereof are provided to a device, the device is capable of determining the actions to be performed on the information to be retrieved for each selected slide based upon markings made by the user on the handout pages. In these embodiments, the device may obtain images of the pages of the handout, analyze the images to determine the user markings, and determine the selected actions based upon the user markings.

In step 810, time information is determined for each slide determined in step 804. The time information for a slide is indicative of when the slide was presented or displayed during the presentation. As previously described, the time information for each slide (or item) may be stored in a database or repository. According to an embodiment of the present invention, the information may be stored in a XML structure. Accordingly, as part of step 810, in order to determine the time information for the selected slides, the XML structure or database entries for the selected slides of the handout are determined. According to an embodiment of the present invention, the XML structure or database entries can be determined based upon the unique identifiers for the selected slides determined in step 804.

The time information determined for a selected slide in step 810 may identify a time when the slide was displayed or presented. The time information may also identify spans of time during the presentation when the slide was displayed.

In step 812, the recorded information for the presentation from which information for the selected slides is to be retrieved is accessed. As previously indicated, information identifying the storage location of the recorded information may be stored in a database or repository. According to an embodiment of the present invention, the information may be stored in a XML structure. Accordingly, the storage location information may be determined from the XML or database entries. The recorded information for the presentation is then accessed from the determined storage location.

In step 814, for each slide determined in step 804, portions of the recorded information (accessed in step 812) are determined and retrieved for the slide based upon the time information determined the slide determined in step 810. In embodiments where the user can specify types of information to be retrieved for each slide, the portions of information determined and retrieved in step 814 for each slide correspond to the type(s) of information identified for the slide in step 806. In embodiments of the present invention that do not allow the user to specify the type of information to be retrieved, or if the user does not specify the type of information to be retrieved, a default or pre-configured type (or types) of information may be retrieved in step 814.

For example, let's assume that it has been determined in step 804 that the user has selected slide #1. Further lets assume that it has been determined in step 806 that the audio and video information is to be retrieved for slide #1, and that it has been determined in step 810 that slide #1 was displayed during the presentation between times T1 and T2. Given the above, in step 814, audio information and video information between times T1 and T2 are retrieved for slide #1 from the recorded information for the presentation accessed in step 812.

In embodiments where the user can specify an action to be performed, a step 816 may be performed in which, for each slide determined in step 804, the actions determined in step 808 to be performed on the information corresponding to the slide are performed. In embodiments of the present invention that do not allow the user to specify actions to be performed, or if the user does not specify any action, a default action may be performed (e.g., information may be output using an output device, information may be saved to a storage medium, etc.). In certain embodiments, no action may be performed if the user does not specify an action to be performed.

Figure 9:
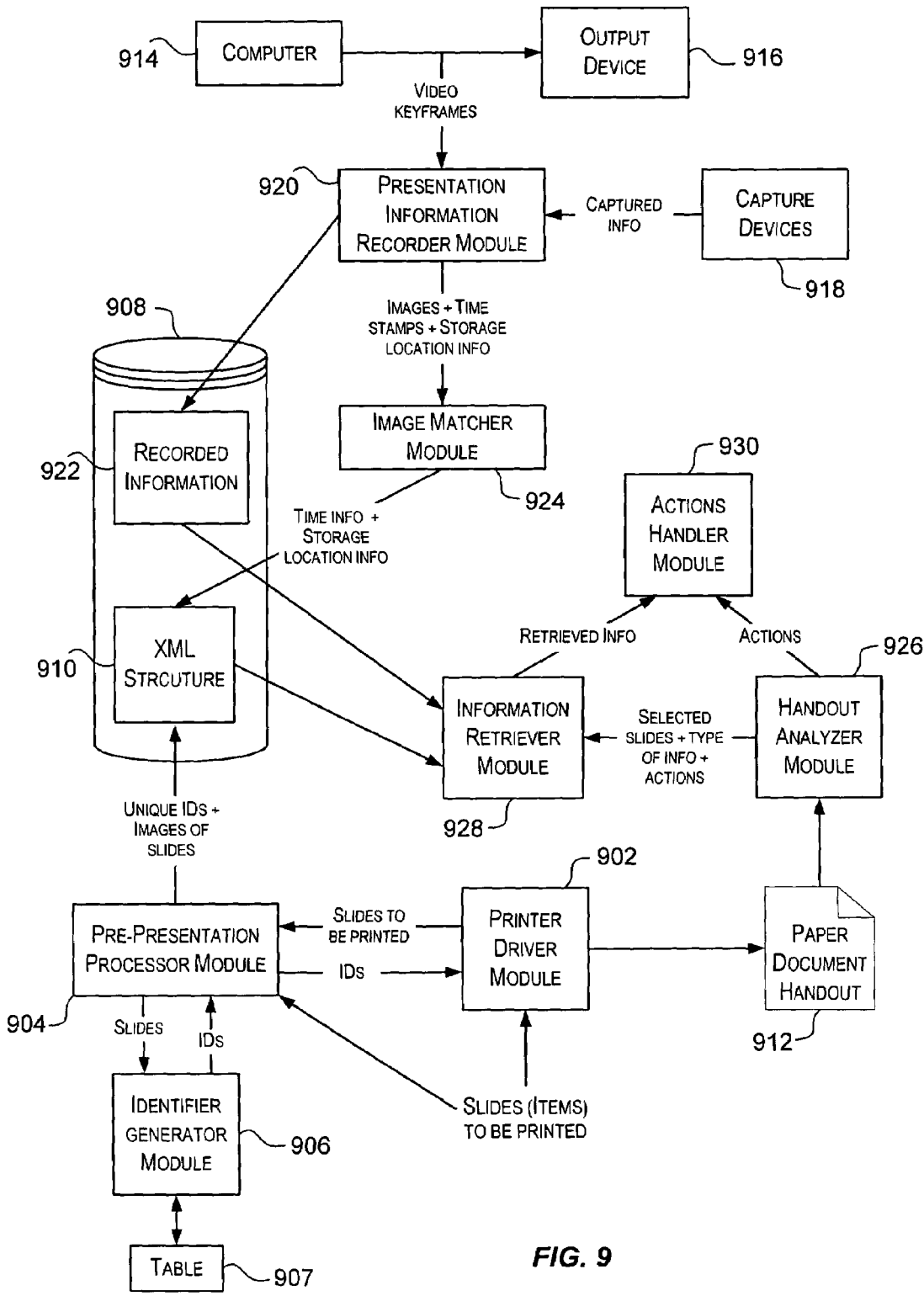
FIG. 9 is a simplified block diagram of modules that may be used to implement an embodiment of the present invention.

FIG. 9 is a simplified block diagram of modules that may be used to implement an embodiment of the present invention. The modules may be implemented in software or hardware, or combinations thereof. The modules depicted in FIG. 9 are merely illustrative of an embodiment incorporating the present invention and do not limit the scope of the invention as recited in the claims. One of ordinary skill in the art would recognize other variations, modifications, and alternatives. For purposes of description, it is assumed that the items printed on a handout are slides. In alternative embodiments, the modules may also be used to perform processing for other types of items that are printed on paper document handouts for presentations.

Printer driver module 902 is configured to facilitate printing of a handout. Printer driver module 902 receives information identifying slides (items) to be printed on a handout. For example, printer driver module 902 may receive information identifying a PowerPoint™ file to be printed. Upon receiving items to be printed, printer driver module 90 is configured to forward the information to pre-presentation processor module 904.

Pre-presentation processor module (PPPM) 904 is configured to receive information identifying slides (items) to be printed from printer driver module 902. In alternative embodiments, PPPM 904 may also receive information identifying items to be printed from the user or some other source or application. For each slide to be printed, PPPM 904 sends a signal to identifier generator module (IGM) 906 that is configured to generate a unique identifier for each slide to be printed. Various different types of identifiers may be used. According to an embodiment of the present invention, IGM 906 generates a 10-digit unique identifier for each slide to be printed in a paper document handout. The first 5-digit portion of the unique identifier identifies a presentation identifier that identifies the presentation for which the handout is being printed. The next 5-digit portion of the unique identifier uniquely identifies the slide for which the unique identifier is generated. PPPM 904 receives the unique identifier information from IGM 906 for each slide to be printed.

According to an embodiment of the present invention, IGM 906 maintains a table 907 of presentation numbers for the various presentations. When a signal is received from PPPM 904 for slides for a new presentation, IGM 906 generates a previously unused presentation identifier for the presentation and generates an identifier for each slide. The combination of the presentation identifier and the slide identifier forms the unique identifier for a slide. For presentations that have already occurred, in addition to the presentation identifiers for the presentations, IGM 906 may also store information in the table identifying the symbolic presentation files that were presented during the presentations, and the storage locations of the recorded information for the presentations. The information may be stored in table 907. This information allows other processes to determine where to retrieve the recorded information corresponding to a given presentation. Unique identifiers generated by IGM 906 for the slides to be printed are communicated to PPPM 904.

PPPM 904 is also configured to obtain representations of the slides to be printed. As described earlier, the representations may be images of the slides. PPPM 904 may itself generate images of the slides to be printed. Alternatively, PPPM 904 may receive images of the slides to be printed from some external program (e.g., PowerPoint™ may provide JPEG images to PPPM 904).

PPPM 904 is configured to store the unique identifiers (received from IGM 906) and the corresponding images of the slides to be printed in a repository 908. Other information related to the slides to be printed such as the name of the PowerPoint™ file comprising the slides, the pages on which the slides are located in the PowerPoint™ file, etc. may also be stored by PPPM 904 in repository 908. According to an embodiment of the present invention, the information is stored as a XML structure 910.

PPPM 904 is configured to provide the unique identifiers information to printer driver module 902. Printer driver module 902 prints the slides and the corresponding unique identifiers on a paper medium to generate a paper document handout 912. For each slide, the unique identifier generated for the slide and received from PPPM 904 is also printed proximal to the slide. According to an embodiment of the present invention, the unique identifiers are printed in the form of barcodes.

PPPM 904 may also process the representations of the slides to extract metadata (e.g., images, image features, text, etc.) from the representation information. This extracted information may be used by other modules depicted in FIG. 9. For example, the extracted information may be used by image matcher module 924 for image comparisons. The extracted metadata information and information associating the metadata with the slides may be stored, for example, in table 907, or in some other memory location.

Printer driver module 902 may print one or more handouts. Each handout may comprise one or more paper pages. Each page may have one or more slides printed on it. Other information, in addition to slides, may also be printed in a handout.

During a presentation, the slides may be output using a computer 914 (e.g., a laptop executing a PowerPoint™ presentation) and an output device 916. Output device 916 may be part of computer 914 or may an external screen, etc. It should be apparent that various other types of devices (e.g., projector, video camera) may also be used to display the slides during a presentation.

As previously described, capture devices 918 are configured to record information during a presentation. The information recorded during a presentation may include information of various different types. Presentation information recorder module (PIRM) 920 is configured to receive information captured by the various capture devices 918. The information received by PIRM 902 may include various types or streams of information including audio information, video information, etc. In order to capture information related to slides that are displayed, PIRM 920 may also be configured to tap the video output of computer 914 and capture video keyframes each time a significant difference is detected between displayed video frames. PIRM 920 also receives temporal information for the recorded information from capture devices 918. For a piece of recorded information that does not have temporal information associated with it, PIRM may be configured to deduce the temporal information for the piece based upon temporal information associated with other types of information captured during the presentation.

PIRM 920 is configured to store the recorded information. As depicted in FIG. 9, the recorded information 922 may be stored in repository 908. Information identifying the storage location of recorded information 922 is also stored. The storage location information may be stored in table 907 maintained by IGM 906.

PIRM 920 is also configured to extract images from recorded information 922. The extracted images along with temporal information associated with the images are forwarded to image matcher module (IMM) 924. Information identifying the storage location of recorded information 922 may also be forwarded to IMM 924.

IMM 924 is configured to compare the contents of images (representations) of the slides printed on the handout and stored in repository 908, and images extracted from the recorded information that are received from PIRM 920. Based upon the comparison, IMM 924 is configured to determine time information for each printed slide. The time information determined for a slide indicates the time during the presentation when the slide was displayed or presented. IMM 924 may use various different techniques to perform the image comparisons. For example, the techniques described in U.S. application Ser. No. 10/412,757, and U.S. Provisional Application No. 60/462,412, may be used. Other techniques known to those of ordinary skill in the art may also be used.

The time information determined by IMM 924 for the slides printed in the handout is stored in repository 908. According to an embodiment of the present invention, the time information may be stored in XML structure 910.

The information stored in repository 908 may then be used to access portions of recorded information 922. Handout analyzer module (HAM) 926 is configured to receive a handout (or one or more pages from the handout) marked by a user. From the handout, HAM 926 is configured to determine slides (or items) that have been selected by the user. For example, for pages depicted in FIGS. 3B, 4B, and 5B, HAM 926 is configured to determine boxes 310, 410, or 510 marked by the user. For each selected slide, HAM 926 is configured to determine the unique identifier for the slide. According to an embodiment of the present invention, for each selected slide, HAM 926 is configured to read a barcode that is printed in the handout and corresponds to the selected slide. The barcode identifies the unique identifier for the selected slide. In some embodiments, the images of the slides themselves may act as the unique identifiers.

In embodiments that allow a user to specify the type of information to be retrieved for each selected slide, HAM 926 is configured to analyze the handout pages to determine the type of information to be retrieved for each slide. In embodiments that allow a user to specify the actions to be performed on the retrieved information, HAM 926 is configured to analyze the handout pages to determine the actions to be performed for each slide.

Information determined by HAM 926 is forwarded to information retriever module (IRM) 928. Information identifying the actions to be performed may be forwarded to actions handler module 930. IRM 928 is configured to determine time information for the selected slides and retrieve portions of recorded information 922 for each slide based upon the time information for the slide. Using the unique identifiers information for the selected slides received from HAM 926, IRM 928 determines the time information for each selected slide from XML structure 910.

IRM 928 then uses the time information determined for the slides to retrieve portions of the recorded information for the presentation. IRM 928 may determine the storage location of the recorded information for the presentation from XML structure 910. IRM 928 may also determine the storage location of the recorded information from table 907 maintained by IGM 906. IRM 928 accesses recorded information 922 and retrieves portions of the recorded information based upon the time information determined for each selected slide. If the types of information to be retrieved for a slide have been specified, then portions of those types of information are retrieved from recorded information 922.

IRM 928 may output the retrieved information using an output device. In embodiments where actions have to be performed on the retrieved information, IRM 928 may forward the retrieved information to actions handler module (AHM) 930. For each selected slide, AHM 930 is configured to perform the specified actions on the information retrieved for that slide. Examples of actions that may be performed include outputting the information, saving the information to a particular location or storage medium, communicating the retrieved information, generating a paper document (or a printable representation) of the retrieved information, etc.

Figure 10:
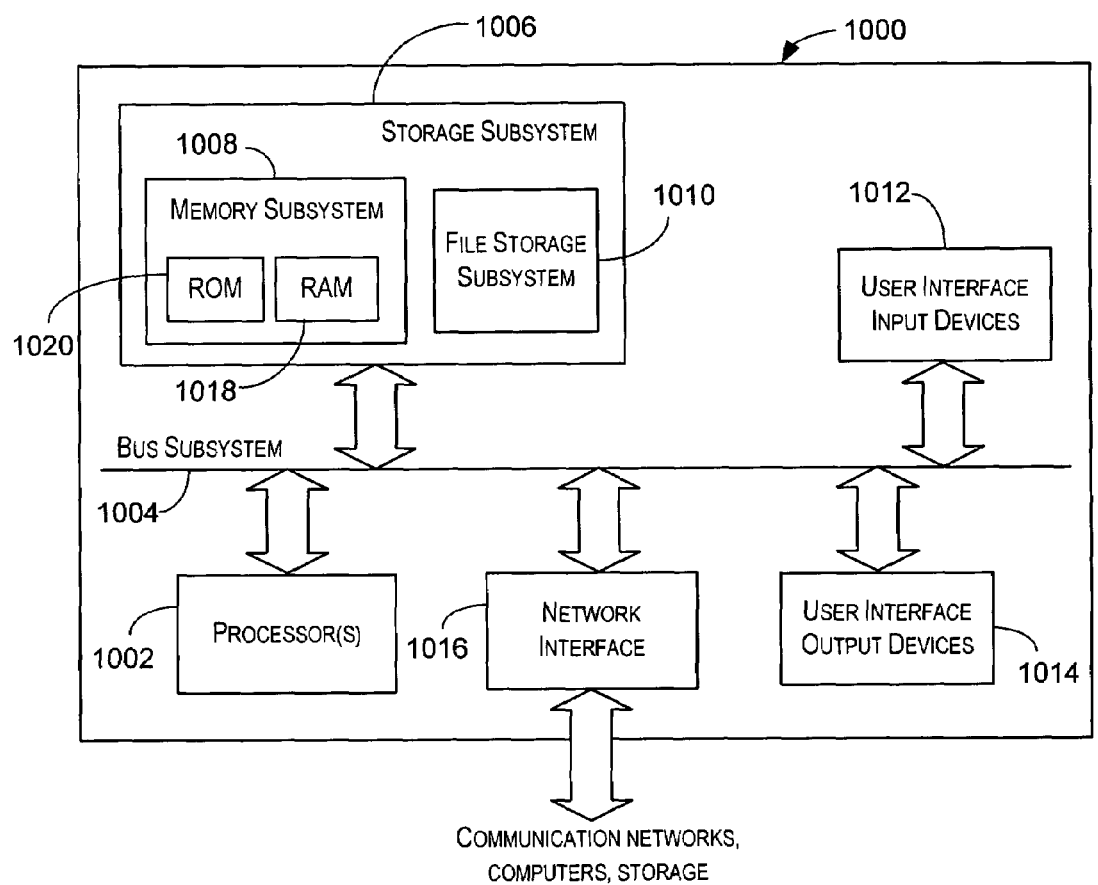
FIG. 10 is a simplified block diagram of data processing system that may be used to perform processing according to an embodiment of the present invention.

FIG. 10 is a simplified block diagram of data processing system 1000 that may be used to perform processing according to an embodiment of the present invention. As shown in FIG. 10, data processing system 1000 includes at least one processor 1002, which communicates with a number of peripheral devices via a bus subsystem 1004. These peripheral devices may include a storage subsystem 1006, comprising a memory subsystem 1008 and a file storage subsystem 1010, user interface input devices 1012, user interface output devices 1014, and a network interface subsystem 1016. The input and output devices allow user interaction with data processing system 1002.

Network interface subsystem 1016 provides an interface to other computer systems, networks, and storage resources. The networks may include the Internet, a local area network (LAN), a wide area network (WAN), a wireless network, an intranet, a private network, a public network, a switched network, or any other suitable communication network. Network interface subsystem 1016 serves as an interface for receiving data from other sources and for transmitting data to other sources from data processing system 1000. For example, data processing system 1000 may access stored recorded information for a presentation and XML data structures via network interface subsystem 1016. Embodiments of network interface subsystem 1016 include an Ethernet card, a modem (telephone, satellite, cable, ISDN, etc.), (asynchronous) digital subscriber line (DSL) units, and the like.

User interface input devices 1012 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information to data processing system 1000.

User interface output devices 1014 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term "output device" is intended to include all possible types of devices and ways to output information from data processing system 1000.

Storage subsystem 1006 may be configured to store the basic programming and data constructs that provide the functionality of the present invention. For example, according to an embodiment of the present invention, software modules implementing the functionality of the present invention may be stored in storage subsystem 1006. These software modules may be executed by processor(s) 1002. Storage subsystem 1006 may also provide a repository for storing data used in accordance with the present invention. For example, the XML structures and the recorded information for a presentation may be stored in storage subsystem 1006. Storage subsystem 1006 may comprise memory subsystem 1008 and file/disk storage subsystem 1010.

Memory subsystem 1008 may include a number of memories including a main random access memory (RAM) 1018 for storage of instructions and data during program execution and a read only memory (ROM) 1020 in which fixed instructions are stored. File storage subsystem 1010 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 1004 provides a mechanism for letting the various components and subsystems of data processing system 1002 communicate with each other as intended. Although bus subsystem 1004 is shown schematically as a single bus, alternative embodiments of the bus subsystem may utilize multiple busses.

Data processing system 1000 can be of varying types including a personal computer, a portable computer, a workstation, a network computer, a mainframe, a kiosk, or any other data processing system. Due to the ever-changing nature of computers and networks, the description of data processing system 1000 depicted in FIG. 10 is intended only as a specific example for purposes of illustrating the preferred embodiment of the computer system. Many other configurations having more or fewer components than the system depicted in FIG. 10 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps. It should be understood that the equations described above are only illustrative of an embodiment of the present invention and can vary in alternative embodiments of the present invention.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A computer-implemented method of enabling information recorded during a presentation to be accessed subsequent to the presentation using a printed paper document for the presentation, the method comprising:

receiving, prior to occurrence of the presentation, information identifying a set of items to be presented during the presentation, the information for the set of items to be printed on the paper document for the presentation;

receiving, subsequent to the occurrence of the presentation, information indicating selection of one of the set of items using the information printed on the paper document;

accessing recorded information comprising information generated and recorded during the presentation;

determining time information for the selected item indicative of when the selected item was presented during the presentation; and retrieving a portion of the recorded information corresponding to the presentation of the selected item based upon the time information determined for the selected item.

2. The method of claim of 1 wherein receiving information indicating selection of an item printed in the paper document for the presentation comprises:

obtaining an image of a page of the paper document printed for the presentation on which the selected item is printed; and determining the selection of the item from the image of the page.

3. The method of claim 1 wherein receiving information indicating selection of an item printed in the paper document for the presentation comprises:

receiving information indicating selection of a barcode printed on a page of the paper document printed for the presentation, the barcode identifying the selected printed item.

4. The method of claim of 1 further comprising:

receiving a signal identifying a first type of information to be retrieved for the selected printed item; and wherein retrieving the information comprises retrieving information of the first type for the selected printed item from the recorded information based upon the time information determined for the selected printed item.

5. The method of claim of 1 further comprising:

receiving information identifying a first action to be performed on information retrieved for the selected printed item; and performing the first action on the information retrieved for the selected printed item.

6. The method of claim 5 wherein performing the first action comprises outputting the information retrieved for the selected printed item via an output device.

7. The method of claim 5 wherein performing the first action comprises saving the information retrieved for the selected printed item.

8. The method of claim 5 wherein performing the first action comprises communicating the information retrieved for the selected printed item.

9. The method of claim of 1 wherein receiving information identifying the set of items to be printed comprises receiving a signal to print the set of items.

10. The method of claim of 1 wherein determining time information comprises:

receiving one or more images extracted from the recorded information;

comparing the one or more images extracted from the recorded information with the set of items printed in the paper document for the presentation; and determining the time information for each item in the one or more items based upon the comparison.

11. The method of claim of 1 further comprising storing information identifying a storage location of the recorded information.

12. The method of claim of 1 wherein the one or more items comprise slides.

13. A computer-implemented method of accessing information using a paper document, the method comprising:

storing first information comprising time information for one or more slides presented at a presentation, the time information for each slide in the one or more slides indicative of when the slide was presented during the presentation;

receiving a signal indicating selection of a slide from a set of slides printed on a paper document for the presentation;

determining time information for the selected slide using the first information, the time information for the selected slide indicative of when the selected slide was presented during the presentation; and accessing information from information recorded during the presentation based upon the time information determined for the selected slide.

14. The method of claim 13 wherein storing the first information comprises:

receiving one or more images extracted from the information recorded during the presentation;

identifying the one or more slides presented at the presentation by comparing the one or more extracted emages with image of slides in the set of slides printed on the paper document for the presentation; and determining the time information for each slide in the one or more slides based upon the comparison.

15. The method of claim 13 further comprising:

receiving a signal indicating selection of a type of information for the selected slide; and wherein accessing information of the selected type based upon the time information determined for the selected slide.

16. The method of claim 13 further comprising:

receiving a signal indicating selection of an action to be performed for the selected slide; and performing the selected action on the information accessed from the information recorded during the presentation.

17. The method of claim 16 wherein performing the selected action comprises outputting the accessed information via an output device.

18. The method of claim 16 wherein performing the selected action comprised saving the accessed information.

19. The method of claim 16 wherein performing the selected action comprises communicating the accessed information.

20. The method of claim 13 further comprising:

storing second information identifying the set of slides printed on the paper document for the presentation, the first information stored prior to occurrence of the presentation.

21. A computer program product stored on a computer readable medium for enabling information recorded during a presentation to be accessed using a printed paper document for the presentation, the computer program product comprising:

code for receiving, prior to occurrence of the presentation, information identifying a set of items to be presented during the presentation, the information for the set of items to be printed on the paper document for the presentation;

code for receiving, subsequent to the occurrence of the presentation, information indicating selection of one of the set of items using the information printed on the paper document;

code for accessing recorded information comprising information generated and recorded during the presentation;

code for determining time information for the selected item indicative of when the selected item was presented during the presentation; and code for retrieving a portion of the recorded information corresponding to the presentation of the selected item based upon the time information determined for the selected item.

22. The computer program product of claim of 21 wherein the code for receiving information indicating selection of an item printed in the paper document for the presentation comprises:

code for obtaining an image of a page of the paper document printed for the presentation on which the selected item is printed; and code for determining the selection of the item from the image of the page.

23. The computer program product of claim of 21 wherein the code for receiving information indicating selection of an item printed in the paper document for the presentation comprises:

code for receiving information indicating selection of a barcode printed on a page of the paper document printed for the presentation, the barcode identifying the selected printed item.

24. The computer program product of claim of 21 further comprising:

code for receiving a signal identifying a first type of information to be retrieved for the selected printed item; and wherein the code for retrieving the information comprises code for retrieving information of the first type for the selected printed item from the recorded information based upon the time information determined for the selected printed item.

25. The computer program product of claim of 21 further comprising:

code for receiving information identifying a first action to be performed on information retrieved for the selected printed item; and code for performing the first action on the information retrieved for the selected printed item.

26. The computer program product of claim 25 wherein the code for performing the first action comprises code for outputting the information retrieved for the selected printed item via an output device.

27. The computer program product of claim 25 wherein the code for performing the first action comprises code for saving the information retrieved for the selected printed item.

28. The computer program product of claim 25 wherein the code for performing the first action comprises code for communicating the information retrieved for the selected printed item.

29. The computer program product of claim of 21 wherein the code for receiving information identifying the set of items to be printed comprises code for receiving a signal to print the set of items.

30. The computer program product of claim of 21 wherein the code for determining time information comprises:

code for receiving one or more images extracted from the recorded information;

code for comparing the one or more images extracted from the recorded information with the set of items printed in the paper document for the presentation; and code for determining the time information for each item in the one or more items based upon the comparison.

31. The computer program product of claim of 21 further comprising code for storing information identifying a storage location of the recorded information.

32. The computer program product of claim of 21 wherein the one or more items comprise slides.

33. A computer program product stored on a computer-readable medium for accessing information using a paper document, the computer program product comprising:

code for storing first information comprising time information for one or more slides presented at a presentation, the time information for each slide in the one or more slides indicative of when the slide was presented during the presentation;

code for receiving a signal indicating selection of a slide from a set of slides printed on a paper document for the presentation;

code for determining time information for the selected slide using the first information, the time information for the selected slide indicative of when the selected slide was presented during the presentation; and code for accessing information from information recorded during the presentation based upon the time information determined for the selected slide.

34. The computer program product of claim 33 wherein the code for storing the first information comprises:

code for receiving one or more images extracted from the information recorded during the presentation;

code for identifying the one or more slides presented at the presentation by comparing the one or more extracted images with images of slides in the set of slides printed on the paper document for the presentation; and code for determining the time information for each slide in the one or more slides based upon the comparison.

35. The computer program product of claim 33 further comprising:

code for receiving a signal indicating selection of a type of information for the selected slide; and wherein the code for accessing the information from the information recorded during the presentation comprises code for accessing information of the selected type based upon the time information determined for the selected slide.

36. The computer program product of claim 33 further comprising code for receiving a signal indicating selection of an action to be performed for the selected slide; and code for performing the selected action on the information accessed from the information recorded during the presentation.

37. The computer program product of claim 36 wherein the code for performing the selected action comprises code for outputting the accessed information via at output device.

38. The computer program product of claim 36 wherein the code for performing the selected action comprises code for saving the accessed information.

39. The computer program product of claim 36 wherein the code for performing the selected action comprises code for communicating the accessed information.

40. The computer program product of claim 33 further comprising:

code for storing second information identifying the set of slides printed on the paper document for the presentation, the first information stored prior to occurrence of the presentation.

41. A system comprising:

a data processing system; and a memory configured to store recorded information comprising information recorded during a presentation, wherein the data processing system is configured to:

receive, prior to occurrence of the presentation, information identifying a set of items to be presented during the presentation, the information for the set of items to be printed in the paper document for the presentation, receive, subsequent to the occurrence of the presentation, information indicating selection of one of the set of items using the information printed on the paper document;

access recorded information comprising information generated and recorded during the presentation, determine time information for the selected item indicative of when the selected item was presented during the presentation; and retrieve a portion of the recorded information corresponding to the presentation of the selected item based upon the time information determined for the selected item.

42. The system of claim of 41 wherein the data processing system is configured to:

obtain an image of a page of the paper document printed for the presentation on which the selected item is printed, and determine the selection of the item from the image of the page.

43. The system of claim of 41 wherein the data processing system is configured to receive information indicating selection of a barcode printed on a page of the paper document printed for the presentation, the barcode identifying the selected printed item.

44. The system of claim of 41 wherein the data processing system is configured to:

receive a signal identifying a first type of information to be retrieved for the selected printed item, and retrieve information of the first type for the selected printed item from the recorded information based upon the time information determined for the selected printed item.

45. The system of claim of 41 wherein the data processing system is configured to:

receive information identifying a first action to be performed on information retrieved for the selected printed item, and perform the first action on the information retrieved for the selected printed item.

46. The system of claim 45 wherein the data processing system is configured to output the information retrieved for the selected printed item via an output device.

47. The system of claim 45 wherein the data processing system is configured to save the information retrieved for the selected printed item.

48. The system of claim 45 wherein the data processing system is configured to communicate the information retrieved for the selected printed item.

49. The system of claim of 41 wherein the data processing system is configured to receive a signal to print the set of items.

50. The system of claim of 41 wherein the data processing system is configured to:

receive one or more images extracted from the recorded information, compare the one or more images extracted from the recorded information with the set of items printed in the paper document for the presentation, and determine the time information for each item in the one or more items based upon the comparison.

51. The system of claim of 41 wherein the memory is configured to store information identifying a storage location of the recorded information.

52. The system of claim of 41 wherein the one or more items comprise slides.

53. A system comprising:

a data processing system; and a memory configured to store first information comprising time information for one or more slides presented at a presentation, the time information for each slide in the one or more slides indicative of when the slide was presented during the presentation, the memory further configured to store information recorded during the presentation, wherein the data processing system is configured to:

receive a signal indicating selection of a slide from a set of slides printed on a paper document for the presentation, determine time information for the selected slide using the first information, the time information for the selected slide indicative of when the selected slide was presented during the presentation, and access information from the information recorded during the presentation based upon the time information determined for the selected slide.

54. The system of claim 53 wherein the data processing system is configured to:

receive one or more images extracted from the information recorded during the presentation, identify the one or more slides presented at the presentation by comparing the one or more extracted images with images of slides in the set of slides printed on the paper document for the presentation, and determine the time information for each slide in the one or more slides based upon the comparison.

55. The system of claim 53 wherein the data processing system is configured to:

receive a signal indicating selection of a type of information for the selected slide, and access information of the selected typo based upon the time information determined for the selected slide.

56. The system of claim 53 wherein the data processing system is configured to:

receive a signal indicating selection of an action to be performed for the selected slide, and perform the selected action on the information accessed from the information recorded during the presentation.

57. The system of claim 56 wherein the data processing system is configured to output the accessed information via an output device.

58. The system of claim 56 wherein the data processing system is configured to save the accessed information.

59. The system of claim 56 wherein the data processing system is configured to communicate the accessed information.

60. The system of claim 53 the memory is configured to store second information identifying the set of slides printed on the paper document for the presentation, the first information stored prior to occurrence of the presentation.

61. A system for enabling information recorded during a presentation to be accessed using a printed paper document for the presentation, the system comprising:

means for receiving, prior to occurrence of the presentation, information identifying a set of items to be presented during the presentation, the information for the set of items to be printed on the paper document for the presentation;

means for receiving, subsequent to the occurrence of the presentation, information indicating selection of one of the set of items using the information printed on the paper document;

means for accessing recorded information comprising information generated and recorded during the presentation;

means for determining time information for the selected item indicative of when the selected item was presented during the presentation; and means for retrieving a portion of the recorded information corresponding to the presentation of the selected item based upon the time information determined for the selected item.

62. A system for accessing information using a paper document, the system comprising:

means for storing first information comprising time information for one or more slides presented at a presentation, the time information for each slide in the one or more slides indicative of when the slide was presented during the presentation;

means for receiving a signal indicating selection of a slide from a set of slides printed on a paper document for the presentation;

means for determining time information for the selected slide using the first information, the time information for the selected slide indicative of when the selected slide was presented during the presentation; and means for accessing information from information recorded during the presentation based upon the time information determined for the selected slide.

* * * * *

UNITED STATES PATENT AND TRADEMARK OFFICE
CERTIFICATE OF CORRECTION

PATENT NO. : 7,206,773 B2
APPLICATION NO. : 10/660867
DATED : April 17, 2007
INVENTOR(S) : Berna Erol et al.

Page 1 of 1

It is certified that error appears in the above-identified patent and that said Letters Patent is hereby corrected as shown below:

Column 24, line 10:

"emages with image of slides in the set of slides printed"

should read

-- images with image of slides in the set of slides printed --

Signed and Sealed this

Thirtieth Day of October, 2007

JON W. DUDAS
*Director of the United States Patent and Trademark Office*